(12) United States Patent
Chien

(10) Patent No.: US 11,114,865 B2
(45) Date of Patent: *Sep. 7, 2021

(54) DESK TOP ITEM WITH LED MEANS HAS USB-UNITS OR USB- MODULE TO CHARGE OTHER ELECTRIC OR DIGITAL DATA DEVICES

(71) Applicant: Tseng-Lu Chien, Walnut, CA (US)

(72) Inventor: Tseng-Lu Chien, Walnut, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/548,561

(22) Filed: Nov. 20, 2014

(65) Prior Publication Data
US 2015/0082057 A1    Mar. 19, 2015

Related U.S. Application Data

(63) Continuation of application No. 14/105,607, filed on Dec. 13, 2013, now Pat. No. 8,915,608, which is a
(Continued)

(51) Int. Cl.
*H02J 7/00*    (2006.01)
*F21V 8/00*    (2006.01)
(Continued)

(52) U.S. Cl.
CPC .............. *H02J 7/00* (2013.01); *F21S 6/003* (2013.01); *F21S 8/035* (2013.01); *F21V 15/01* (2013.01); *F21V 23/02* (2013.01); *F21V 23/023* (2013.01); *F21V 23/06* (2013.01); *F21V 33/00* (2013.01); *F21V 33/0004* (2013.01); *F21V 33/0024* (2013.01); *F21V 33/0048* (2013.01); *F21V 33/0056* (2013.01); *G02B 6/0045* (2013.01); *G04B 19/30* (2013.01); *G06F 1/266* (2013.01); *G09F 23/00* (2013.01); *H01R 13/6691* (2013.01); *H01R 25/006* (2013.01);
(Continued)

(58) Field of Classification Search
CPC ............... G02B 6/0045; H01R 13/691; H01R 13/6691; F21V 33/006; F21V 330/02; H01H 2009/186; F21Y 2101/02; F21S 8/035
USPC ........... 362/95, 157, 641; 439/490; 320/114, 320/137; 363/142, 146
See application file for complete search history.

(56) References Cited

U.S. PATENT DOCUMENTS 5,347,211 A * 9/1994 Jakubowski ............ G05F 1/575
323/281
6,211,581 B1 * 4/2001 Farrant .................... G06F 1/266
307/115
(Continued)

OTHER PUBLICATIONS

Daniel, Quirky Ember Portable Study Lamp with USB Ports and Power Outlets, Jan. 28, 2011, Gadgetsin.com, http://gadgetsin.com/quirky-ember-portable-study-lamp-with-usb-ports-and-power-outlets.htm.†
(Continued)

*Primary Examiner* — Anabel Ton
(74) *Attorney, Agent, or Firm* — Bacon & Thomas, PLLC

(57) ABSTRACT

Desk top items with LEDs also include USB-unit(s) or USB-module(s) and, optionally, additional outlet-units, to supply charging power to other electric or digital devices such as a smart phone or digital data device. The USB-unit(s) or USB-module(s) are arranged to supply power only, and do not have an additional USB data transfer function.

13 Claims, 10 Drawing Sheets

Related U.S. Application Data continuation of application No. 13/161,643, filed on Jun. 16, 2011, now Pat. No. 8,783,936.

(51) Int. Cl.

| | | |
|---|---|---|
| H01R 13/66 | (2006.01) | |
| H01R 25/00 | (2006.01) | |
| F21V 23/02 | (2006.01) | |
| F21V 15/01 | (2006.01) | |
| F21V 23/04 | (2006.01) | |
| H01R 13/713 | (2006.01) | |
| H01R 24/76 | (2011.01) | |
| F21S 8/00 | (2006.01) | |
| G09F 23/00 | (2006.01) | |
| H02G 3/14 | (2006.01) | |
| F21V 33/00 | (2006.01) | |
| G04B 19/30 | (2006.01) | |
| H02J 4/00 | (2006.01) | |
| G06F 1/26 | (2006.01) | |
| F21S 6/00 | (2006.01) | |
| F21V 23/06 | (2006.01) | |
| F21W 121/00 | (2006.01) | |
| H01H 9/18 | (2006.01) | |
| H01R 103/00 | (2006.01) | |
| F21Y 115/10 | (2016.01) | |

(52) U.S. Cl.
CPC ............ *H02G 3/14* (2013.01); *H02J 4/00* (2013.01); *H02J 7/007* (2013.01); *H02J 7/0042* (2013.01); *H02J 7/0047* (2013.01); *F21V 23/0442* (2013.01); *F21V 33/006* (2013.01); *F21W 2121/00* (2013.01); *F21Y 2115/10* (2016.08); *G02B 6/0021* (2013.01); *H01H 2009/186* (2013.01); *H01R 13/713* (2013.01); *H01R 24/76* (2013.01); *H01R 2103/00* (2013.01); *H02J 2207/20* (2020.01)

(56) References Cited

U.S. PATENT DOCUMENTS

| | | | | |
|---|---|---|---|---|
| 6,474,823 | B1 | 11/2002 | Agata et al. | |
| 7,264,377 | B2* | 9/2007 | Cooper | F21V 23/0485 362/276 |
| 7,318,659 | B2* | 1/2008 | Demarest | H05B 47/10 362/253 |
| 7,679,317 | B2* | 3/2010 | Veselic | G06F 1/266 320/106 |
| 7,736,033 | B2* | 6/2010 | Patel | F21V 33/00 362/414 |
| 7,742,293 | B2 | 6/2010 | Strauser | |
| 7,832,917 | B2* | 11/2010 | Chien | F21S 8/035 362/641 |
| 7,871,192 | B2* | 1/2011 | Chien | H04N 5/2354 362/249.02 |
| 7,897,277 | B2 | 3/2011 | Meyer et al. | |
| 7,901,115 | B2* | 3/2011 | Chien | H04N 5/2354 362/109 |
| 8,113,147 | B1* | 2/2012 | Wang | A01K 63/06 119/267 |
| 8,116,007 | B2 | 2/2012 | Tsai | |
| 8,432,667 | B2 | 4/2013 | Strauser | |
| 8,545,039 | B2 | 10/2013 | Patel | |
| 8,562,187 | B2 | 10/2013 | Smed | |
| 8,593,912 | B1* | 11/2013 | Amores | G04G 11/00 368/79 |
| 8,687,392 | B2* | 4/2014 | Sims | H02M 7/02 363/125 |
| 8,758,031 | B2 | 6/2014 | Cheng et al. | |
| 8,783,936 | B2* | 7/2014 | Chien | 362/641 |
| 8,853,884 | B2* | 10/2014 | genannt Berghegger | H02J 9/005 307/125 |
| 8,888,311 | B2* | 11/2014 | Parsons | F21L 4/005 362/183 |
| 8,899,797 | B2 | 12/2014 | Schaak | |
| 8,915,608 | B2* | 12/2014 | Chien | 362/157 |
| 9,131,560 | B2* | 9/2015 | Williams | F21S 6/002 |
| 9,798,293 | B1* | 10/2017 | Roohani | G04G 11/00 |
| 10,181,686 | B1* | 1/2019 | Patel | H01R 13/7036 |
| 10,184,649 | B2* | 1/2019 | Chien | H05B 47/105 |
| 10,247,402 | B2* | 4/2019 | Chen | H01R 13/74 |
| 10,260,735 | B2* | 4/2019 | Chien | H02J 7/00 |
| 2003/0193795 | A1* | 10/2003 | Brown | F21V 33/0048 362/84 |
| 2004/0252515 | A1* | 12/2004 | Opolka | F21V 3/00 362/410 |
| 2005/0207170 | A1* | 9/2005 | Opolka | B60Q 3/59 362/391 |
| 2006/0209530 | A1* | 9/2006 | Schaak | G11B 33/06 362/86 |
| 2006/0221017 | A1* | 10/2006 | Fang | G09F 9/30 345/83 |
| 2008/0304255 | A1* | 12/2008 | Cauchois | F21V 21/06 362/183 |
| 2009/0067161 | A1 | 3/2009 | Nagata | |
| 2010/0039792 | A1* | 2/2010 | Meyers | F21S 6/002 362/20 |
| 2010/0224697 | A1* | 9/2010 | Modlin | B05B 17/0684 239/102.1 |
| 2010/0321939 | A1* | 12/2010 | Patel | F21S 6/005 362/253 |
| 2012/0113645 | A1* | 5/2012 | Liao | H02J 7/0042 362/253 |
| 2014/0036518 | A1* | 2/2014 | Schaak | B43M 99/006 362/410 |
| 2015/0192283 | A1* | 7/2015 | Chien | F21V 33/0052 362/227 |
| 2016/0143109 | A1* | 5/2016 | Lal | F21S 6/002 315/294 |
| 2017/0175997 | A1* | 6/2017 | Rosenblum | A45B 3/04 |
| 2017/0209840 | A1* | 7/2017 | Swallow | A61M 11/005 |
| 2019/0158303 | A1* | 5/2019 | Gharabegian | H04L 12/283 |
| 2019/0319470 | A1* | 10/2019 | Chien | H01R 25/006 |

OTHER PUBLICATIONS

USB Battery Charging Specification Rev. 1.2, pp. i-ii, 41-44, USB Implementers Forum, Inc, Dec. 7, 2010, http://www.usb.org/developers/docs/devclass_docs/.†

Cooper, Driving LED lamps some simple design guidelines, Aug. 2007, LEDsMagazine, http://www.ledsmagazine.com/articles/print/volume-4/issue-8/features/driving-led-lamps-some-simple-design-guidelines.html.†

\* cited by examiner
† cited by third party

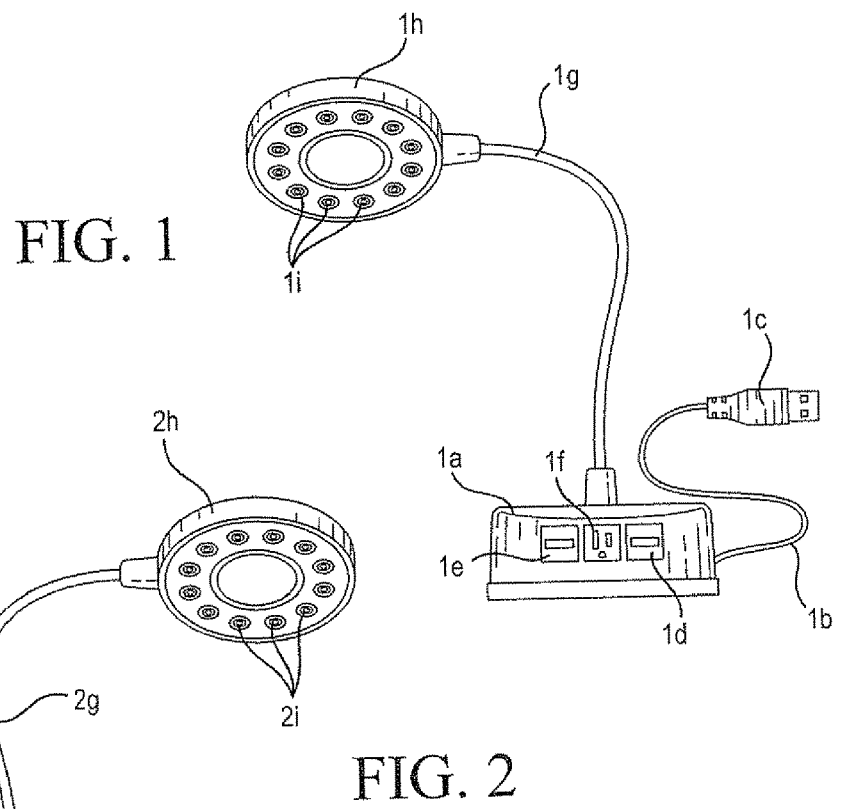
FIG. 1
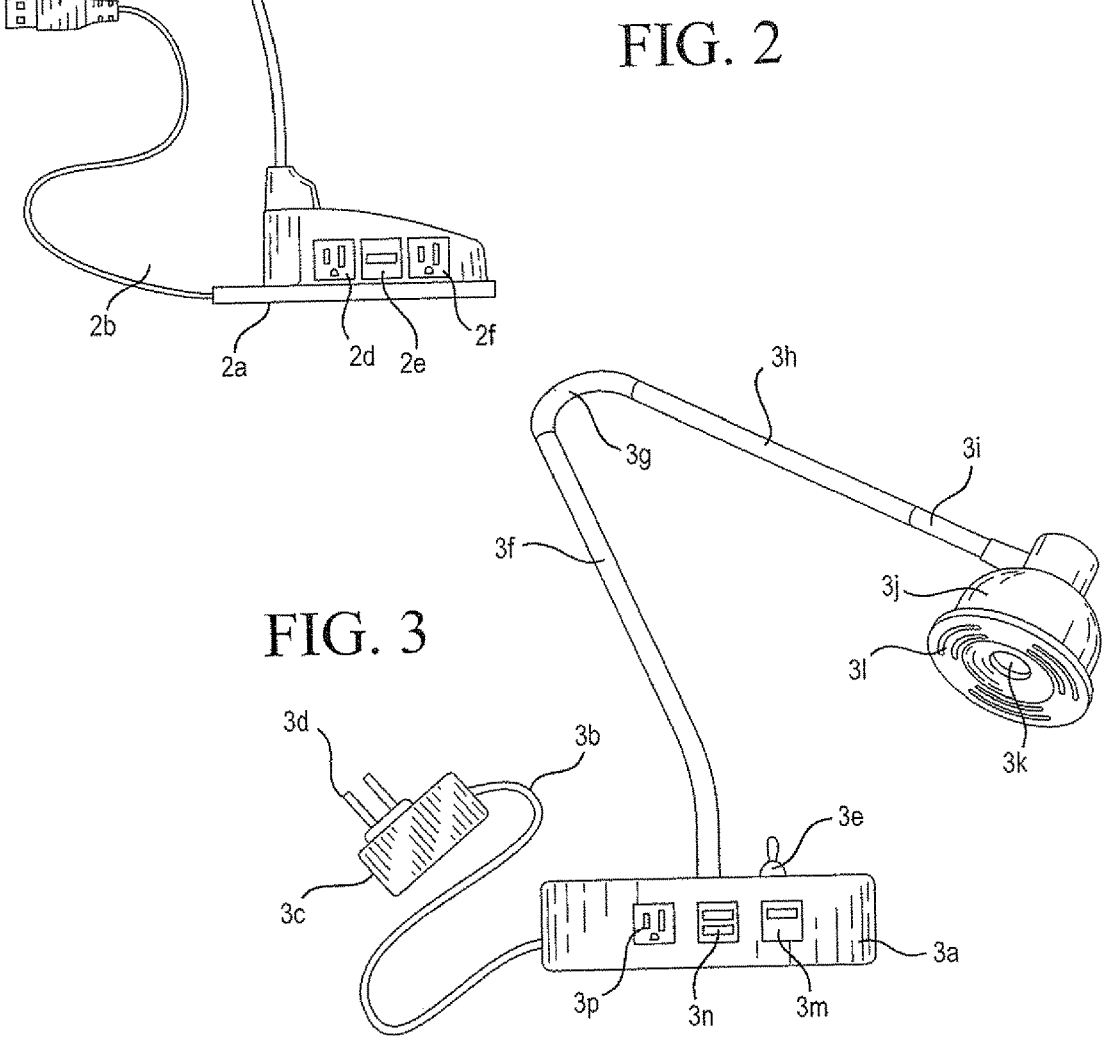
FIG. 2
FIG. 3

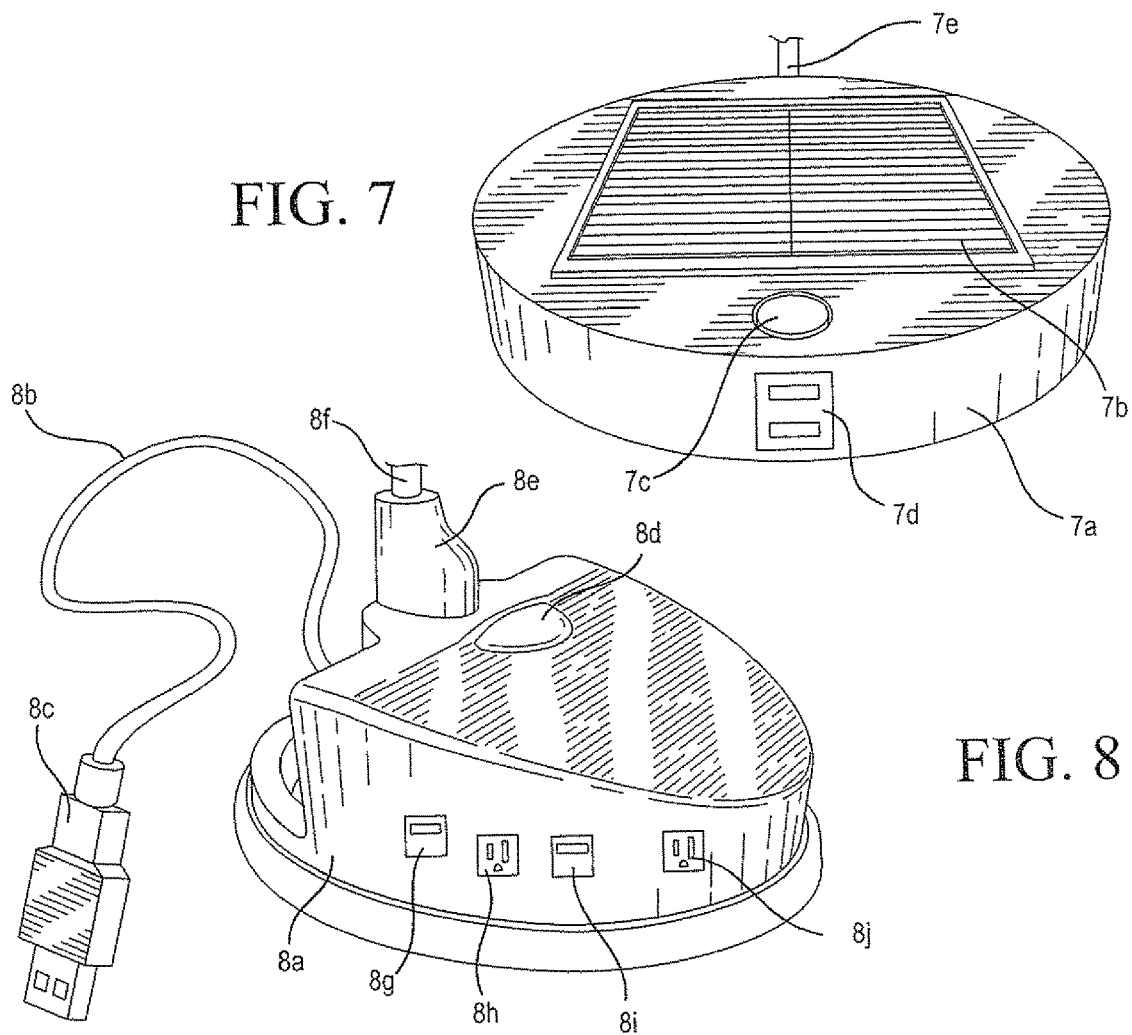
FIG. 7
FIG. 8
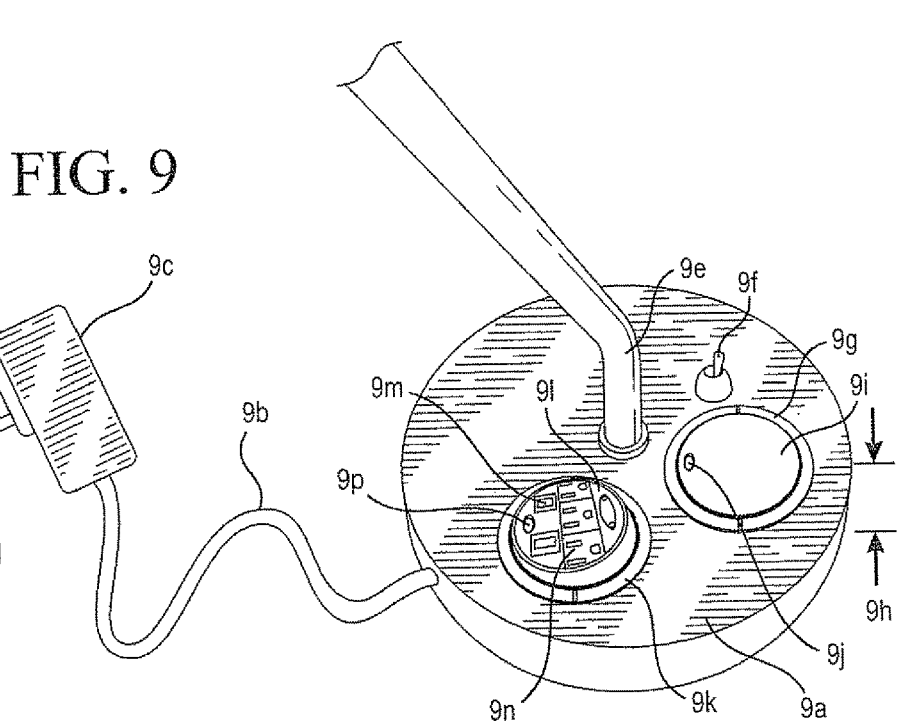
FIG. 9

DESK TOP ITEM WITH LED MEANS HAS USB-UNITS OR USB-MODULE TO CHARGE OTHER ELECTRIC OR DIGITAL DATA DEVICES

This application is a continuation of U.S. patent application Ser. No. 14/444,703, filed Dec. 31, 2013, which is a continuation of U.S. patent application Ser. No. 13/161,643, filed Jun. 16, 2011, and now U.S. Pat. No. 8,783,936, each of which is incorporated by reference herein.

BACKGROUND OF THE INVENTION

This application is having subject matter in common with the inventor's U.S. patent application Ser. No. 13/117,227, filed on May 30, 2011, and entitled "Universal module of USB-unit or Outlet-units for electric or digital data device(s)."

This application also has subject matter in common with the inventor's U.S. patent application Ser. Nos. 12/502,661, 12/292,580, 12/566,322, 11/498,874, 11/527,629, 12/622,000, 12/624,621, which disclose a sealed-unit with uniform dimensions and shape to fit into the same uniformly dimensioned compartment so that the universal sealed-unit can fit into a variety of LED light devices. The sealed unit(s) disclosed in these applications share the following features:

a. The sealed-unit(s) has uniform dimensions to fit into the uniform compartment of any kind of LED light device.
b. The sealed-unit(s) has passed all related safety standards and received a laboratory's safety certification so that it can be used with other LED light device's parts and accessories which may or may not meet the safety standard passed by the said sealed-unit(s).
c. The sealed-unit(s) can be any individually salable unit because it has passed all related safety requirements and standards. The other parts or accessories may or may not be just decorative or have other functions to make the LED light device more valuable.

The current invention utilizes the sealed-unit concept in the following manner:

(1) The current invention utilizes the concept disclosed in the above-cited applications of providing a sealed-unit that has passed all the relevant safety standards but applies the concept to other electric device(s) which are not limited to an LED light device. The concept may be applied to an LED light device, power strip device, wall outlet device, surge protection device, wall adaptor device, charging device(s), smart phone related device(s), computer related device(s), and other consumer electric device(s).

(2) The sealed-unit may be in the form of a USB-unit or outlet-unit rather than the previously disclosed LED-unit, battery-pack, or prong-means.

(3) The USB-unit or outlet-unit both may be arranged to supply power from these units to a variety of electric devices to keep the electric device(s) in good power condition for people to use.

(4) The USB-unit or outlet-unit may each include its own related circuit-means, conductive-means, contact-means, receiving-means, output-ends, input-ends, electric parts and accessories to supply electric power from a prong-cable means or USB-cable means to a receiving-means for supplying power to a variety of electric device(s).

(5) The current invention offers a universal design for the USB-unit or outlet-unit with the most compact size to enable each of the USB-unit and outlet-unit or any combination of USB-units and/or outlet-units to form a desired module that fits into all kinds of electric device(s), including an LED light device, wall outlet, wall outlet adaptor, power strips, surge protector, communication device, computer device, consumer electric device, smart phone device, panel computer device, etc.

(6) Once the USB-unit or outlet-unit has passed all related safety standards and has its own issued certification, the finished electric device in which it is used does not need to get an additional safety certification related to USB-units or outlet-units.

(7) The modules of the current invention can utilize any combination of suitable USB-unit or outlet-unit parts, such as a conductive wire, conductive plate, conductive means, contact-means, prong-cable means, USB-cable means, prong-means, resilient conductive means, printed circuit means, flexible circuit means, related electric parts and accessories, fixing means, positioning means, and/or installation means to enable the module, outlet-unit, or USB-unit to pass the safety standard and get the relevant safety certification and be added onto another electric device.

(8) The module of the current invention may have different specifications, such as:

1 USB-unit with 1 USB-port,
1 USB-unit with 2 USB-ports+1 outlet-unit,
1 USB-unit with 2 USB-ports+2 outlet-units,
1 outlet-unit.
or
any combination of USB-units and outlet-units that still permits a standard module to fit into different electric device(s) as needed.

(9) The module can also have the following different specifications:

2 USB ports having different current outputs including 500 ma, 1 Amp, 1.1 Amp, and/or 2.2 Amps to enable the 2 USB-ports to charge different electric devices such as an iPhone™, which needs to have 1 Amp, and an iPad™, which requires 2.1 Amps. If people want to charge 1 iPhone™+1 iPad™ at the same time, at least 3.1 Amps will be needed, which will be very expensive. If people want to charge the 1 iPhone™ or 1 iPad™ at different times, the standard module can be 1 port 1 Amp+1 port 1.1 Amp=2.1 Amps total, and the cost will be cheaper. If people want to charge only 1 iPhone™, only need 1 USB-unit with 1 port which has only 1 Amp is needed for the most economical product. Hence, the module of the invention should not be limited to only one specification.

(10) Because the standard module, outlet-unit or USB-unit is a sealed-unit that has its own issued safety certification and that can fit into the uniform compartment of any other electric device, there is no need to file, for each different electric devices, a UL, ETL, or CSA safety certification, which saves a lot of time for tooling, development, and safety testing for each different electric device. This will reduce a lot of R&D, development, tooling, safety certification time and fees.

The copending application entitled "Universal module of USB-unit or Outlet-unit for electric or digital data device," U.S. Ser. No. 13/117,227, discloses a simple arrangement for enabling "Desk Top items with LED means having USB-unit(s) or USB-module(s) to charge a variety of electric or digital data device(s)," which does not require a universal module because some of the desk top items with LED means have plenty of room/space to accommodate a larger size of USB-unit(s) or USB-module(s) and reduce the cost for related electric components, parts, or accessories to make the items more cost attractive to the consumer. The USB-unit(s) is an electric charging unit which has a USB-female receiving means (also known as a USB port) to receive a USB-male prong (also known as a USB plug) to deliver electric power from the USB-female receiving means to the other device's USB-male prong. The preferred USB-female receiving means gets power from a power source and uses circuit means to convert the input electric power to output electric power having a desired waveform, voltage, and current flow or amperage (A or ma) to enable the USB-male means to supply power to other electric or digital device(s).

The USB-module(s) described in the copending application is an electric charging module which has at least one USB-female receiving means but also has a number of receiving means selected from an outlet-female receiving means (also known as an outlet or outlet port), USB-female receiving means, an adaptor's female receiving means (also known as an adaptor port), or any conventional female receiving means or ports to form a single body which has more than one USB-female receiving means to offer the same or different electric power though the different female receiving means within the one body. The USB-module connects with a power source and circuit-means to offer a desired waveform, voltage, and current (A or ma) to charge other device(s) when the female receiving means relates to the male prong means of each style of the connect-means.

To enable people to easily reach, touch, operate, or manage the desk top items, the USB-unit(s) or USB-module(s) are installed on or within the item or a substrate(s). The items may be positioned at a location where people will stay for a period, such as a desk, table, bed, chair, land, grass, or wherever else people work, rest, or take a nap. For example, people use a computer, laptop computer, iPhone™, iPad™, or iCloud™ on a substrate(s), location, or place such as a table, desk, bed, laptop stand, laptop supporter, laptop cushion or any similar surface(s) which allows people to work, sleep, or lay down for a period of time while charging other electric or digital data device(s).

Wherein the definition for Desktop Item which have desired parts and accessories to make desktop item can stay on desktop surface including:

1. From FIGS. 1, 2, 3, 4, 5, 6, The said One of Desktop items is LED desk top lighting have large size of the LED light or From FIGS. 1, 2, 3, 4, 5, 6 LED desktop light device have its big base with or without weight-unit(s) inside so prevent from the heavy wires or people hit the light to fall down from desktop surface, and/or
2. From FIG. 1, 2, 3, 4, 5, 6, The said desktop item including the LED light device with LED illumination or added other functions which enables the LED device to serve as a non-portable desk top" as FIGS. 1, 2, 3, 4, 5, 6 have big size base, and FIGS. 7, 8, 9, 10, 11, 12 have thicker or more bigger size with or without heavy-unit(s) inside.
3. From FIGS. 1, 2, 3, 4, 5, 6, 7, 8, 9, 10, 11, 12, 13, 14, The said desktop items have USB-charging port or USB-unit has USB-pot(s) to supply DC current to other products.
4. From FIGS. 1, 2, 3, 4, 5, 6, 7, 8, 9, 10, 11, 12, 13, 14, one of Desktop items including at least one of USB Charging-port(s) or the said USB-unit, or USB-module has USB-port and/or outlet-port. Or USB-charging pot(s) inside the sealed-unit or universal-unit which install on desktop items
5. From FIGS. 23,24,25, 26,27,28, The said desktop item shows some of the desktop items people use on desktop and all these functions can add into the said Desk top LED lighting.
6. From FIG. 24 show one of desktop items or added function into said LED light device which is other one of the desktop items or added function into said LED light device which is the project lighting to project the desired LED light-beam, lighted-pattern, lighted-image, and/or 7.
8. From FIG. 27 show one of desktop items or added function into said LED light device which is alarm clock, LED digital clock to offer time, date, week, month, year, weather related information including temperatures basing on current invention and all above listed co-pending and earlier filed case drawing. Or the added function is offering the multiple colors LED light beam or changeable color LED lighting. and/or combination with color selection and function selection and desired market available LED light effects, performance, and/or
9. From FIG. 28 show one of desktop items or added function into said LED light device which is offer food FIG. 28 or offer show one of desktop items or From FIG. 25 show one of desktop items or added function into said LED light device which is added function into said LED light device which offer the coffee or water or soup or liquid device. And/or
10. From FIG. 29 show one of desktop items or added function into said LED light device which is a multiple functions air-flow device which also offer LED lighted patterns lighted image for desired color and brightness for light-beam, lighted patterns, lighted image or any
11. The said semi-permanent device except people replace or move out to use anymore such as
(a) From FIG. 1, 2, 3, 4, 5, 6, 7, 8, 9, 10, 11, 23,24,25,26, 27,28 is some of desktop items which is desktop non-movable LED light as FIG. 1,2, 3, 4, 5, 6, 7, 8, 9, 10, 11 because too big size and too heavy, or These desktop item or added function into LED desktop lighting device is too heavy and no any consumer will carry it for a portable device, so this is means semi permanently installed on a desktop except people do not use anymore. This called semi-permanently.

The common sense from people or market traditional concept and acknowledgement the said desktop items which has big size or big-base or base with weight-unit inside so can solid to arrange on desktop and these big-size base or add heavy-unit(s) to prevent the LED from falling off the desktop until removed by a user despite a cord of the LED light hanging over an edge of the desktop are common sense against the portable-items which like US prior art Quirky can put into backpack and carry all the time and use for anywhere.

(b) From FIG. 23,24,25,26,27,28,29 with at least LED light to supply illumination and USB-port and/or added other functions selected from the
  (b-1) FIG. 23 is LED lava light which sold anywhere in USA and it have the glitter or reflector or wax inside with chemical compound or salt water or motor to make the inner miniatures, reflector, liquid to move with color changing, brightness changing or setting or selection as all market available items for LED light beam for multiple color or single color or low brightness or high brightness with sensor, switch, motion sensor, power fail, RF or wireless controller as market existing items functions,
  (b-2) FIG. 24 for project light to project lighted image, lighted patterns or light beam. The said project is including the said project inner image-forming-unit or project outside object shape so can project the said lighted-image, lighted-pattern, light-beam.
  (b-3) FIG. 24 LED is project light-beam or lighted-pattern or lighted-image which desired round top-piece which has built-in project lighted image or patterns or light-beam from the ball or half ball surface while have reflector on half-ball surface to project the lighted-image. It also has the project optic-lens on full ball to project inner image-forming-unit for far-away distance surface.

(b-4) FIG. 25 is liquid machine with LED light(s) same as all market items with LED for operation status which is same as current invention said is one of desktop items with LED light.

(b-5) FIG. 26 for air-freshener, air-purifier, air-sprayer, moisture sprayer device as all market items which install on desktop to offer fresh air or smell air to people with LED light to offer colorful or desired accent light for this kind of device as market available items.

(b-6) FIG. 27 LED alarm clock which is LED 8 segments to form the time or LCD display unit which has LED light-source light-beam to passing through the light passable LCD to show the time or weather related data, or FIG. 27 is LED weather station or time piece which has the LED light-source to offer the light-beam or back light to glow the front LCD display for many time and weather data or (b-7) FIG. 28 candle machine has LED light as market and playground exiting items to let people can try their luck while people put into coin.

(b-8) FIG. 29 LED air-flow device which create the desired temperature air-flow including air-flow or cold-air or hot-air or air with moisture, air-with frequent device with built-in LEDs to emit the desired LED light-beam for colorful and brightness which can have all LED light-effects, light-functions for change or setting or select the color and brightness, From FIG. 29, shown one of market available air-flow device to offer air-flow, or other airflow including heat, moisture, air-freshener, and/or (c) From FIG. 1, 2, 3, 4, 5, 6 show the said Desktop LED light device which has angle adjustable bar, pole, tube which can be adjustable as common sense or market all models as FIG. 1, 2, 3, 4, 5, 6 shown the tube, bar, pole has not seen the inner snake-hose or angle-adjustable-kit inner construction, but all marketing items which none-of the desk lighting without the angle adjustable arm, tube, bar so this means all the ugly snake-hose or adjust-angle-kit is inside the said coating, sleeve, envelope, soft-sealing. So, each bar or tube or pipe or pole for angle adjust purpose is "The adjustable arm has inner bendable parts sealed within an outer plastic material or tube, a coating or a metal material that is comfortable to touch"

(d) From FIG. 23, 24, 25, 26, 27, 28, 29 each of the Existing market products as (d-1) FIG. 23 is market available LED laser light offer area-illumination and have built-in USB-Charging port(s) and Outlet-ports and the moving liquid by motor or liquid-compound by heat-means to show the desktop items have built-in (i) offer the area-illumination, and (ii) USB-charging ports and (iii) added outlet-port to supply AC current to other products, and (iv) desired color and brightness with desired setting or adjustable or selection of color and brightness This is FACT to prove the said Desktop items had "At least one added function".

(d-2) Same as other FIG. 27 here is the LED digital alarm clock has the (i) LED for area illumination and (ii) project light from top-cover have design or arts to emit desired color light-beam or lighted-pattern or lighted-image or combination, and (iii) offer the time, date, week, monthly, year and weather including tempera-ture, and (iv) built in speaker on two sides, and (v) has the setting, selection, adjustable total 8 switch on surrounding the LCD or 8 LEDs segments LED light-source, and (v) the said built-in USB and outlet to match the claim "At least one added function".

(d-3) Same as FIG. 29 show the Air-flow device has the (i) LED offer area illumination including light-beam or lighted-patterns or lighted-image or any combination as drawing show and also have (ii) air-flow which can be air, cool air, hot-air, air with humility, air with smell including freshener, or air-fragrance, and have (iii) USB-port and (iv) Outlet ports which have 4 functions inside the LED desktop items have LED for offer the illumination and have the other added functions to meet the claim "At least one added function".

Same as FIG. 24 for LED project light device which have (i) LED to offer area illumination and (ii) project light-beam or lighted-image or lighted-pattern from internal image-forming-unit or outside object shape through the built-in optics-piece including refractive and/or reflective lens so can show the projected light-beam and/or lighted-image and/or light-beam to be seen at the LED project device or areas away from the project device to match the claim said" At least one added function".

The current invention has big improvement than all US prior arts which mainly not same categories with current invention as bellow list US prior arts is as below:

1. Daniel, Auirky Ember "Portable study lamp with USB port and power outlets, Jan. 28, 2011.

US Quirky device is a portable study lamp with USB port and power outlet And as the Sep. 15, 2015 Third party page 45 show very clear "Quirky confession the device is "POR-TABLE STUDY LAMP and POWER STRAP→WANT A LAMP INTEGRATED BOTH OF FUNCTION", and the page 45 show apply the power-strap on wall-outlet and light is hanging on the wall . . . . (This is totally different the definition of current invention for DESKTOP ITEM, No need dictionary to explain the meaning for "Desktop items" vs." Portable POWER-STRAP & PORTABLE Study Light".

This is strong-evidence for (Quirky "Quirky confession the device is "PORTABLE STUDY LAMP and POWER STRAP→WANT A LAMP INTEGRATED BOTH OF FUNCTION" is not for the permanently installation on desk top items. This is totally different categories for (Portable device) vs. (Current invention for only for permanently desktop items except people not use or replace it.

However, the different for both as below discussion, including:

The current invention is;

a. Non-portable device, and never can put into backpack to carry anywhere often (supported by FIG. 1, 2, 3, 4, 5,6, 7,8, 9,10,11).

b. Permanently install on desktop which will not move evenly because always put on desktop surface and it is big and heavy and impossible to fit into backpack. (supported by FIG. 1, 2, 3, 4, 5,6, 7,8, 9,10,11).

c. Has Big size or big base or too heavy stop fall out from desk top surface (supported by FIG. 1, 2, 3, 4, 5,6, 7,8, 9,10,11).

d. Has the bendable arms which is sealed by plastic or chemical coated to form soft touch surface (Supported by FIG. 11 and FIG. 13 and FIG. 14)

e. Current invention has adjustable arm or bar or rod which has base which is 90 degree install on the LED desktop base (Supported by FIG. 8,9,11,12)

f. The USB port install base wherein the base and base of flexible arms is on Vertical or around 90-degree relation and not can changeable angle (Supported by FIG. 8, 9, 11, 12)

g. All USB-port is face outside install on the base contour side wall to prevent water or ash get into the USB-Charging port(s) to make the electric shortage or over-heat because accumulated dust or ash to reduce the electric contact-surface. (Support by FIG. 7,8,11,12 and FIG. 1, 2, 3, 4, 5, 6)

h. Quirky not use Transformer for outside AC-to-DC power source which is AC-wired because Quirky is one of extension cord and add snake-house arms LED for light. (Supported by FIG. 3→3C) (FIG. 5=>5C) (FIG. 9→9c)

i. Quirky not has the added functions such as 1. FIG. 23 Lava light with moving reflector, miniature moving effects, or FIG. 24 project built-in image forming-piece or outside object lighted-image or lighted-patterns or light-beam, or FIG. 25 liquid supplier, or FIG. 26 air-freshener or air-frequency or moisture functions, or FIG. 27 digital LED clock, or LCD alarm clock offer time, date, weather, sound, 8 switch for adjust, setting, selection for colorful and desired brightness, or FIG. 29 offer Air-flow, lighted patterns, lighted-image or light-beam, or FIG. 28 lighted candy or food supplier or vending machine all have the said LED light-source building to supply area-illumination (Support by Ivan FIG. 22, 24, 25, 26, 27, 28, 29).

j. Added function need different DC working voltage such as super brightness LED Or COB LED (Chip-on-board LED which is same as dice LED have to install on the Pronged circuit board, this is not new, Just Nick-Name of Chip-on-board same as Dice-on-Board—DOB) need to use 6V or higher which is not same as LED light or USB port 3/5 Volt. Quirky did not have this kind of other DC-to-DC current to offer other added-function because Quirky do not have other added-functions for extension cord with LED light, No Air-flow, No cosmetic mirror, No Clock or alarm clock, No air-sprayer, No music, No speaker, No project the object or built-in image-forming-unit lighted-patterns or lighted-image or light-beam. The current invention had this. (supported by FIG. 15+16+18 LED matrix, array, circle+FIG. 23, 24, 25, 26, 27, 28, 29 for added-functions into LED light-device and meet the current invention Claim add limitation)

k. The LED light device of one of Desktop items, the said adjustable arm or bar or tube or pole must have longer length which need higher than people waist to shoulder and need width must from base location to people at least one eye this width, so people can use while reading or working. The current invention LED lighting is Big-size or Big-base or heavy unit, so it is not able to move like Quirky extension-cord very light so can put base in any movable location(s) for each time carry out to new place so Quirky just need short arms or bar or tube. The current invention because different concept, construction, application so must be much longer than cross section length of LED Desktop light Cross section! This means the current invention from FIG. 1 to FIG. 6 the arm/bar/pole/tube (Y-axis) or height need close from people waist to shoulder. The (X-axis) or aid width need to from base-location to people eyes position (Normally people will put big and heavy bas away from right or left arms, so the width needs min. have 1 foot or more.==>this is not happening on Quirky 2. China patent 2007-2015 3487 Miss Lin Wa-Yeh filed on Jun. 11, 2007 issued Jun. 25, 2008

From the electric drawing can see that patent disclosure the light source is connect with AC current and the said AC/DC transformer only supply the 3/5V current into the USB ports, Not link to the (Light source) so that is the typical AC power light source. Even at the text said light source can use LED but at 2007 Jun. 11 did not had super bright white LED has market available can use for desk-lamp further said as current invention use a Plurality number of LEDs or recently COB LED-unit at that time before the 2007 June.

The current invention listed the major difference at:

a. The LED is Plurality LEDs arrangement for geometric positions to get desired area illumination.
   (Reaspm: On 2007 it is impossible for white color super bright LEDs+Cost issues) Even do not have COB for built-in plurality of the LED dice into one piece including square, rectangular, even 2017 came out for circle type.

b. The current invention details listed the current get from:

b-1: outside AC-to-DC transformer so can get $1^{st}$ DC. Also, the current invention had $2^{nd}$ added functions, so may incorporate with built-in at least one of DC-to-DC circuit to make more than one or only one DC to fit for LED light source or-and added function or IC or USB export ports for same or different Current. (This is not even existing and mentioned by China 2007 filed patent for concept, application for use outside transformer)→ So this claim should be granted allowance!

b-2: Inside AC-to-DC transformer to get $1^{st}$ DC. The same incorporated with inner one or more than one DC-to-DC circuit to get $2^{nd}/3^{rd}/4^{th}$ DC circuit to let different LEDs or added functions to use which may use same or many different voltages. Such as LED array may need 6 Volt operation voltage which is not all same within 3/5 Volt.

Especially the COB or the High brightness output LED. (This is not happening on the 2007 for the more LEDs==Because update technical for different LED especially for super brightness or super power saving energy, assembly cost need use different working voltage with USB export 5 Volt current).

b-3: Inside AC-to-DC transformer to supply same current to LED or-and another added device. (This is other features no shown on Quirky or China 2007 patent to disclose at all) . . . .

These (3) Specialized my filing feature has these Big Difference for LED desktop light. Which power by AC-wired Is different by (Outside AD-to-DC transformer) because all inner electric parts is different at all!

3. U.S. Pat. No. 7,736,033 Patel

Patel teach one lamp has the cigarette lighter round output receptacle and to receiving the (210) screw in by thread round transformer which transfer from 12 Volt to USB output voltage 5 Volt which is not same as the current invention has the UBS-receiving port which directly offer the 5 Volt current to another electric device.

This prior art been argued so many times. Not know why examiner cannot find one of prior art is similar with current application to let us know has real prior art existing. Not use this old prior art.

4. U.S. Pat. No. 8,687,392 (1) and U.S. Pat. No. 8,687,392(2) Sims et al

This is other application which said the device itself need has the (50 of FIG. 1) capacitor or other energy storage element while the power converter is operating in the standby mode beside the AC-DC power convertor circuit (122 of FIG. 1) and plus other monitor system (54 of FIG.

1) This is not same as current invention for non-self-energy storage device or capacitor to make this expensive circuit for the current invention. So, this is nothing to do with current invention because from AC power source is unlimited power no need to waste money for power saving.

5. U.S. Pat. No. 8,853,884 Genannt berghegger et al

Teach the how to save power while the current is not operation. This kind of circuit is not use for Outlet which is only get power from AC power source only through the inner conductive receptacles to supply the current to inserted into male AC plug no matter when the male AC plug into or not into the receptacle, no any switch to control it. Same as USB ports output current, the current USB-port always relates to AC power source and through AC-to-DC transformer or at least one of DC-to-DC circuit so can get the preferred DC current volt at to the said USB-port or other added functions again no any controller to make power less consumption or become big current to supply the current. That is fixed Amperage and voltage for each USB port.

So, this is nothing to do with current invention because from AC power source is unlimited power no need to waste money for power saving 6. U.S. Pat. No. 8,783,936 Chien This is the co-inventor parent filing case which has all same drawing with current invention. So, it is not the any prior art vs. tis continuously filing case.

The current invention has earlier co-pending filed case including:

1. (#BB-2008 Filed on Sep. 10, 2008 cases=Public Jan. 9, 2009) . . . . As for the LED-unit has Flexible-arms is same as FIG. 6 of PARENT Case of (#AA-2008 Filed May 12, 2008). These 2 (# BB-2008) and (#AA-2008=Mar. 5, 2009 Public=May 12, 2008 Filed) so therefore Quirky did not filed USA patent because it is combining both Ivan 2 concept.

So, the Quirky Jan. 28, 2011 is 2 years later after check Ivan the (# AA-2008) and (# BB-2008) to combine to make the said Quirky Jan. 28, 2011 announcement instead of filed the USA patent filing.

From (A-1) and (A-2) Both is enough to argue with Anabel for Quirky Is not the inventor for these (Power strip) and Outlet+USB+LED . . . . As above 3 Evidence.

A-3: From Quirky photos show, everyone know the Main-unit is (Power strip with USB and Outlet). There is No one will use the Quirky items for desk top lamp for reading.

A-3-1: Quirky items for short arms which not higher than people sitted-shoulder height or not has horizon-axis for min. half-chest length . . . . The shorter arms not have vertical-height, it only can be treated for PRO-TABLE or WORKING TORCH . . . . Meaning from Desk Lamp . . . . This should be having enough height above people shoulder or front arms height and has horizon-axis min. ½ chest width, so can let people have good desk lamp.

A-3-2: Quirky base is 100% can recognized is (Power strip) . . . .

A-3-3: Quirky main-unit is (Power strip) so easily can carry, but same time, while it is power-strip for main-housing→Then it is very easily to portable or put into Backpack . . . . However, All Market Desk Lamp is very difficult to put into backpack and carry. Because Desk top lamp must very goo d installation on desk top surface because need to overcome 3 kind of Force at any time . . . .

(Desk top Lamp) must overcome below 3 force including:

(A-3-3-1) The said outlet device for 1,850 need to use super Heavy 14 gauge-wire (US safety standard). if the LED light wire has outlets-unit for min. 6 feet long. Quirky power strip is not way to overcome this heavy 14 gauge 6 feet long wire weight . . . . So, is there any market power strip is there any one Can put on desktop and no fall from desktop?? The answer is NO!!

(A-3-3-2) The weight from Top LED-unit has LEDs and housing or another optics-lens, PCB.

(A-3-3-3) Arms or LED-Box/housing weight on horizon-axis so can let LED desk lamp not fall down or These 3 Weight can overcome only while the Desk Lamp has (1) Bigger Main-Base so can let all Top LED-unit housing or/and horizon arms center-of-gravity can fall within the Bigg-main base range. Or (2) The main-base must add weight-unit to overcome the center-of-gravity of top LED-unit housing and horizon arms weight So, this is not possible to add on the Quirky shown photos for (Power strips because inside is full of the metal piece for outlets and USB circuit!!

Hence, these are all arguments with Anabel. The Quirky is Not the $1^{st}$ one inventor for his photos because Ivan already show on parent filed case (# AA) and (#BB) and (#CCC) all these 3 cases drawing show very clear Quirky cannot filed USA patens so use publication on some medium.

(2) China patent=2007 Filed, this is very earlier date. Almost same year of Steve Jobs (Apply) came out $1^{st}$ iPhone on 2007.

The difference with current invention:

1. From China patents show the circuitry for incandescent radiation light source (105)
2. From the China patent the circuitry show the Incandescent or other light source is work under the AC current while the Input AC power (100) from outside AC wire (101) and the AC current will go through the conductive-trace or wire to the incandescent bulb (105) and has one on-off switch (103) to turn on or turn off the AC current into the AC power light source.

From whole China patent background, brief drawing, details description did not discuss anything for the LED light source at all only show on the claim 5 said all kind of light source(s) but lack of support from the anywhere of the whole patent for how to get work for DC-Operated LED can use shown circuitry which is AC current deliver to the light source (105).

Basing on the $2^{nd}$ times discussion of the top 2 Prior art for (A) Quirky and (B) China patent, both is invalid US prior art not only for above list discussion, but also current inventor had earlier than Quirky filed date Jan. 22, 2011 as below evidences;

Evidence A;

FIG. 1+2+3+8+9=U.S. Pat. No. 7,824,185(#BB-05)12-232, 035-9-22-10F (extension cord has outlet and LED and 3 contact-points.

Evidence B.

FIG. 6=U.S. Pat. No. 7,722,230(#41) (#AA-08) Filed on 2008

Evidence C;

Column1 Line44 (USB port)+FIG. 10C=U.S. Pat. No. 8,998,462 (#CCC-10) Multiple Surface LED Light filed on Nov. 19, 2010, U.S. Ser. No. 12/950,017 Public date on May 24, 2012 Public Number 2012-012-7708 now is US Patent and issued on Apr. 7, 2015.

Evidence D; (Child Filed patent of # CCC-2010)

FIG. 3+4+6+7+8+9=(# FFF) U.S. Ser. No. 13/117,227 for the PUB PDF File.

Evidence E:

Z=(#UU-2010) filed on Nov. 3, 2010 U.S. Ser. No. 12/938,628 on PUB PDF

The current invention is different with the 3$^{rd}$ group of US prior art including:

1. U.S. Pat. Nos. 7,736,033 and 8,545,039 Patel. The Lamp Base with Electric device recharge receptacle & means. The Bhart's disclosure the Outlets device and the Cigar lighter build on the lamp base. The LampaBase make the input AC current transfer to output current to automobile current (12 Volt), then the Automobile Cigarette make the input current from (12 VDC) to USB end current (5 Volt). This means the Bhart's device at least need 2 expensive circuit/Transformer to get the USB Charger's output current from (120 VAC wall outlets) to (USB Current 5 VDC). This is not economical and none of people need 12 Volt DC for house use at all.

The current invention direct installs the USB Charger unit which transfer the input-end 120 VAC to output-end 5 VDC so this is practically.

2. US Prior Public 2011-017703 Rotabel & concealable device which only has the outlets device with manual switch. This is directly for 120 VAC outlets power source directly though metal piece and delivery 120 VAC to the rotabel & concealable device's receptacles to offer 120 VACS current while the other device's plug means connect with the said receptacle.

'703 patent fail to disclosure the any USB charger concept, circuit, design and application so not have any related with the current invention for USB charger and the current invention device use Overlay to sit on existing lamp base to offer multiple power type power station with a lot of features.

3. US prior art: U.S. Pat. No. 7,897,277 Meyer et al, disclosure the Reversible battery cartridge which are use the AC batteries cartridge as the backup power for the all kind of lamp which mainly for power fail application. This is nothing to do with USB ports and USB charger application. So, there is totally different with current invention related to (1) USB ports+(2) USB Charging+(3) Outlet supply power source+(4) LED light and Universal lamp base to fit for all kind of existing lamp base so not occupy any new desk top space because (5) the Universal Desk base is overlay top of the existing lamp base.

Furthermore, the current invention has (6) LED light incorporate with the above listed (1) (2) (3) (4) (5) so it become a unique practical Universal Power station because (7) the current invention is not only supply one kind of power to charger different electric or digital-data device(s).

4. US prior art—U.S. Pat. No. 6,474,823 Disclosure the laptop computer with top illumination light which is not for the AC power source into USB related circuit to transfer to the DC current to charge DC 5 Volt electric device. The Computer input-end current is 120 VAC but it pass though the computer its transformer already transfer to output-end current at 5 VDC and then there is no any USB Charger circuit inside the computer so the computer's external transformer which directly to delivery 5 VDC current to the to the USB Port so the computer system which is not same as current inventions the input-end current is 120 VAC though USB Charger inside circuit to get the output-end for 5 VDC.

The total circuit and concept is different because computer prior art use the EXTERNAL Transformer which not belong to computer itself parts to transfer the 120V Outlet power Through EXTERNAL transformer get 5 VDC current (Outside the computer). The Computer itself input-end current is 5 VDC and output-end current of USB ports also is 5 VDC so it proof, Computer itself is no any USB Charger circuit inside.

5. US Prior art: U.S. Pat. No. 8,562,187 Smed disclosure FIG. 2 function for outlet-module has the PCBA to transfer the input AC current to 15 Volt 2A to turn on the said LED or to change the input AC current to US power outlet or Other country outlet. This is different with the current invention for AC outlet-unit which is directly to deliver the AC current from input-end directly to the AC current output-end. Also, The Smed other output for 15 Volt DC which is not same as the current invention for DC5V with market available USB-port type to connect with all communication, computer, mobile phone wire's specifications so it is not replaceable. The SMED teach use power cord 36 has connector 7 to outlet connector 5. These is totally different for current invention's outlet-unit which no need any power cord 36 to build the electric delivery from desk top lighting device to the other electric device. The current invention outlet-unit has all outlet-receiving ends and can directly plug-into the other electric device male-prong to get electricity.

The current invention also has major difference with '187 SMED for below details.

5-1. Transformer change AC to DC to 15 Volt 2 Amp DC current to power LED or other and USB port.

This is not workable for the Ivan's because 15 Volt DC is too high and will damage the be-charged items or create the Overheat. The Ivan transformer must be 5 Volt DC with.

So, the '187 SMED 15 Volt DC just to supply power to the Plurality of LEDs and cannot charge other be-charged 5V batteries.

5-2. The '187 SMED not teach the USB ports is Quickly Charging-port min. has 1.0 Amp Charging capacity at the DC 5 Volt.

5-3. The '187 SMED not teach any Quickly charging capacity and details to delivery from USB port to Be-charged items.

5-4. The '187 SMED not teach the 2nd circuit-inside which incorporate with the Transformer's circuit-kits or Transformer's circuit-inner inside the Outside Transformer housing or inside the lighting housing.

5-5. The '187 SMED not discuss USB charging-port at DC 5 Volt and Connection for Be-Charged items. The USB-port 30 distribution the current to what purpose for 15 Volt DC current this too dangerously to use super high voltage 15 Volt DC to charge 5 Volt batteries of the said be-charged items which is not meet US safety regulation by the USB-Charging port requirements including UL or ETL or another test lab. not like current invention details describe all USB Charging-port at DC 5 Volt with Min. 1 Amp to 5 Amp has safety authority certifications to charge the Be-charged device Energy storage unit or assembly so can let be-charged item can operate.

5-6. The '187 SMED transfer 15 Volt 2 Amp DC current which SUPPLY power to LEDs or others, this is not a current invention discussed to charge be-Charged items such as the iPad which need 2.1 Amp or higher to charge properly. SMED 15 Volt not only too risk for Too high voltage to charge the Be-charged inside batteries but also has too few current to charge single one-piece iPad, it is impossible to charge iPad or iPhone at same time which current invention did teach for any combination for more higher amperage needed such as 2.1 Amp, 3.1 Amp, 4.2 Amp. 2.4 Amp, 4,8 Amp and all meet the safety standard for USB Charging-port has 5.0 Volt DC range for output voltage and not harm to other be-charged device which inside battery is 5.0 Volt range.

5-7 The '187 SMED lack of the $2^{nd}$ or more circuit-inside inside the Device as current invention. The $2^{nd}$ or more circuit-unit which may has $2^{nd}$ transformer because if need to SUPPLY ANY LIGHT SOURCE, it may need one Big Power output such as 5 VOLT 5 Amp for Plurality of LEDs Including color changing LEDs (White LED 20 pcs plug Warm white 20 pcs) so need one transfer as the '187 SMED needed. But also need to have current to the said USB Charging-port(s) which may need 5 Volt 4.8 Amp so one transformer is not enough and not good to supply 2 applications. So the current invention need $2^{nd}$ or more circuit so can has $1^{st}$ Circuit-inner to supply the USB Charging-ports and $2^{nd}$ or more circuit-inside to supply current to other application including plurality of LED, Super Big power consumer CFL, Energy saving bulb, LED bulbs, time display (May use separated batteries), or Controller need such as IP cam, motion sensor, IR for dim light help IP cam, wireless communication, motion sensor all these other added functions.

6. US Prior art: U.S. Pat. No. 8,758,031 Cheng et. Teached the inside wall USB charger device which is not same as the current invention. Also, Cheng's filed date is Jul. 23, 2012 which is too late than current inventions. Also, this is for the Power Box inside wall has USB charger. Not same as current invention.

7, 8, 9, US prior art: U.S. Pat. Nos. 7,742,293, 8,116,007, 8,432,667 Strauser teach the music player has pedestal support or foot to put ground the exemplary audio device (system) 10 has a system console 24 supported by a pedestal 20. The system console 24 typically has controls (e.g. volume, play, stop, etc.), displays and indicators. In this exemplary system 10, music or karaoke content comes from a digital music player 80 that is inserted into a cradle 81 (see FIG. 8) and connected to audio inputs 99 of the exemplary system 10.

Even Strauser had teach the USB plug to power the music-player as below content; In a preferred embodiment, the cradle 81 is stepped as disclosed in the parent application, "DIGITAL MUSIC PLAYER CRADLE ATTACHMENT," Which is included by reference. Thereby, the cradle 81 supports a large variety of music players 80 of varying sizes and shapes. In such, the music player 80 sits in a cradle 81. Power is provided from a power port (e.g. USB port) 21, into Which the power cable plugs 82 (e. g. USB plug) is connected to provide power to the music player 80. But it is different with current invention for (1) not desktop items because pedestal 20 for ground installation (2) not people hand reachable distance to charge the other electric device furthermore need to walk to far distance which more trouble than bend body to get power from power strips or outlets (3) No any light source to offer indicator light or any illumination (4) the music player(80) it's do not supply the power to other device which is different with current invention is music device has built-in circuit and transfer input current to DC 5 Volt to charge the other electric device. So, this is not same as current invention for desktop definition and people will stay for a while to charge the other device.

10. U.S. Pat. No. 8,899,797 which for has USB port install on the movable (Movable parts & accessories or Organizer, Or Addable parts & Accessories). (may add the USB-unit or USB-Module or Outlet-unit or Outlet-Module on the MOVEABLE or ADDED parts of Desk lamp)

The '797 who is filed on Aug. 26, 2012 after Co-inventor's U.S. Pat. No. 8,783,936 (# GGG-2011) Public on Dec. 15, 2011. and '797 patent has one prior filed and abandonment as below because it adaptor the phone's custom-pin plug to connect with phone female custom-pin end to build the electric and audio signal delivery, so this is not like the current invention has all USB-port which is female USB receiving ends on the desktop item and though the male-plug kits to of USB wire which has male-plug ends on 2 ends and one end connect with Desktop female USB port and other male plug end inert into the be-Charged device.

Hereof, The comparison for the

11. US Prior art 2006-020-9530 as below:

1. '9530☐has bulb-socket so it is not the Built-in LED lamp. This maximum can add LED bulb Lamp device.

Fact☐Column (0005) Line 10

A terminal housing is disposed relative to the neck second portion, a bulb socket including a seat portion is attached to the terminal housing, and a shell portion of the terminal housing is shaped to receive the base of a light bulb.

2. '953☐The Transformer and Bulb-socket in parallel connection. So, the light source is getting 120 Volt current which is not built-in LED lamp device Fact☐Column (0006)

The lamp support may also house a transformer electrically coupled to the power cord in parallel to the bulb socket.

3. '9530☐The $2^{nd}$ socket on the edge of the support or base is Custom Pin-Out, not regular USB-Port so only can charge 1 model of phone as Contact (44) both all for Customer Pin-Out design. This is limited for one and ONLY ONE item can be charged!!

FACT [0007]

Alternatively, the lamp may include a second socket disposed on the support, the socket having a first end directed internally of the support and coupled to the speaker and a second end positioned externally on the support for connecting to a media device compatible cable.

4. '9530☐No any wire from charging contact (44) or outside socket (50) needed while charging the phone. Because the contact (44) or Outside socket (50) both is custom pin-out construction and the phone just directly plug into this Custom Pin-Out can directly charger . . . . This is only limited one and ONLY ONE phone can be charged. Not like Ivan's use common USB-Female-receiving end and Charging wire's USB insert male-plug to deliver the current and the though charging wire's other ends to connect with the electric or digital device.

The audio output cable (17) though Round Plug (17a) to transmit the data to speaker (15) (15a), Audio Output cable (17) one end to Music media device (100) and another end to Speaker (15a) (15b)

FACT [0019]

As illustrated in FIGS. 1 and 2, an audio output cable 17 is electrically connected via a plug 1711 at one end to each of speakers 15a and 15b. As illustrated in FIGS. 2 and 4, the other end of audio cable 17 may be fed through an orifice 19 in support 12 and be operable to connect, for example, to the headset jack or other audio output terminal of media player 100 as indicated. Alternatively, as illustrated in FIGS. 1 and 3, the orifice 19 may house a connector (not shown) for plug connecting to a plug 17b of output cable 17

5. '9530 ☐do not has built-in LED light source, only can install the LED bulb at the bulb-base. Not like the co-inventor's (3) issued patents or co-pending case has LED built-in as light source, No Bulb-Base at all.

FACT☐(0021) line 10

The light source 24 (e.g. incandescent bulb, halogen lamp, Fluorescent bulb, or one or more LEDs) is mounted in the bulb socket 20 and positioned in a plurality of positions relative to the support 12 by arrangement of the Flexible neck 14.

6. '9530 The contact (44) is Custom Pin-Out type which only can charge one and ONLY one model of the phone. Also, the Recess Slot which also become Big limited to fit one and ONLY one phone.

FACT☐(0025)

As illustrated in FIG. 2, the recess 42 is provided on the top surface of the support 12 for receiving the media player 100. A plurality of contacts 44 are formed at the base or on a Wall of the recess 42.

7. '9530 ☐Only can charge one and ONLY ONE phone because (A) Recess (42) size is fixed (B) The contact (44) need align precisely to the phone contact so can charge one and Only One. Not like Ivan the charging port is common USB-Port!!

FACT☐(0026)

Recess 42 is shaped to snugly receive a lower portion of media device 100 to align or Mattingly couple electrical contacts 46 on the media device 100 with contacts 44 of support 12, and thereby act as a socket for media device 100. Contact between contacts 44 of support 12 and contacts on media device 100 (not shown) for example may permit a rechargeable battery housed Wholly Within media device 100 to charge. Contacts 44 and media device 100 contacts are adapted to Mattingly couple with each other so that DC voltage can be supplied to the rechargeable battery of media device 100 for charging through the coupled contacts 44 and media device 100 contacts. In addition, if the media player 100 includes audio output contacts in proximity to the charging contacts, ones of coupled contacts 44 may be connected to speakers 15a and 15b via an internal cable (not shown) as an alternative to audio output cable 17.

8. '9530☐The LEE unit only can charge one and ONLY One phone and the charge contact all is Custom Pin-Out type. The current invention's items have USB-Port which can work with any USB-Port charging wires to connect with the Other electric device and digital device.

FACT [0027]

In accordance with an alternative arrangement of the present invention and with reference to FIG. 4, a charging circuit is excluded from lighting apparatus 10, and contacts 44 are electrically connected to a socket 50 dis posed on an exterior surface of support 12. Connection between contacts 44 and socket 50 are provided through internally disposed cable 51.

9. '953☐LEE use custom Pin-Out construction on the contact (44) and Outer socket (50) which same as LEE Example iPod© wires for custom pin-out so can fit and charge one and only One phone . . . . Not like the other end on the computer as USB-port which Ivan patent claimed.

FACT (0027) Line 2

Socket 50 is adapted to inter face with the charging and/or data cable associated with media player 100. For example, an IPod media player sold by Apple Inc. typically employs a cable to connect the IPod to a computer via the computer's USB port. This cable has a custom pinout on one end which connects to the IPod device and a USB connection on the other end Which mates With the USB port on a computer.

10. '9530☐LEE device can transmit BOTH DATA and CHARGING. This is not happening at Ivan item because Ivan item only has the CHARGING FUNCTION. This is not same on basic CHARGING of CHARGER DEVICE!! So, this is totally different with Ivan's CHARGER patent.

Fact☐(0027) Line14 to 19

The cable allows both transmission of data between the computer and the IPod and charging of the IPod's internal battery through the USB port on the computer.

11. '9530☐LEE device cable is associated audio media device & get power from the inner charging-circuit and get power from CUSTOM PIN-OUT contact (44) or Outer socket (50)☐This is totally different with Ivan's can charge and ONLY CHARGE many different electric or digital device. Not one and ONLY one as LEE claimed and details description for AUDIO MEDIA DEVICE (100).

FACT☐(0027) Line 2

Socket 50 is adapted to inter face with the charging and/or data cable associated with media player 100.

Also,

US (2006-020-9530) for contact (44) and Outer socket (50) has below text;

The said USB receiving end (USB port) is one end of USB-Charging cable which same as all laptop computer USB receiving end, not USB custom pin-out, not USB mini, Not USB compact, Not USB other name which is the other end of the said USB-Charging cable which only fit for limited number of the electric or digital device.

12. US abandonment public prior art US 2009-006-7161

The Foldable mirror set is not Desktop installation. That is travel unit not let people to install on desktop surface always.

The Power from the Computer and which is not quickly charger and has very limited current less than 500 ma not like current invention has minimum 1.0 Amp up to 5 Amp for definition of the USB Charging-Ports release on 2007 and update on 2010.

Also, the computer USB is not charger into the Foldable mirror into foldable mirrors' internal rechargeable battery. The Computer is SUPPLY the current to the foldable mirror while the USB Male plug into the computer ports and has power. Not charging into rechargeable battery and storage inside the rechargeable ready to use. The foldable mirror had no any internal transformer to change incoming AC current to DC current.

The foldable mirror had no outside transformer get power from outlet AC power source. So, this prior art is nothing to do with current invention.

SO, From Above (12) $3^{rd}$ lot US prior arts points different with LEE (2006-020-9530), The current invention any issued or co-pending filing no any same or similar with LEE's '9530. Furthermore, the '9530 on 2006 is no charging capability over 1.0 Amp as wiki report shown all the history and data so the charring capability and Not allowed the Digital or electric data to delivery on old date 2006, so that is not like current invention for quickly charge USB Charging-Port as above discussion and wiki data!

13. US Prior Art US 2010/0296298 Martin, JR. U.S. Ser. No. 12/761,514 Filed on Apr. 16, 2010

The '298 teach one Rea-Beveled Mirror (12a) of Rear-Beveled cutted edge (12) of FIG. 4 and FIG. 5 or the Rear-Beveled Mirror (14a) of mirror (14) of FIG. 7 shown the special made mirror which is out-of-date mirror design.

Further, from FIG. 7 and FIG. 8 shown the light-strip (14) and LED light source (14-2) which is light strips (14) to fit within the beveled-edge (12a) which is out-of-date because update LED arrangement is dice or chip for Surface mounted on rigid-piece printed-circuit-board and which is just inward to emit light to the curved magnify-mirror to let the curved-mirror-surface work as reflector to emit all light to front which is diffusion light effect emit out to form plurality of the parallel light-beam so not dark and bright area on be-lighted object. The current invention cosmetic mirror is one of magnify have N-time magnify for vanity mirror or cosmetic mirror. Not the focus light effects like '298 get focus as FIG. 6 for all '298 concepts and construction and details.

Furthermore, the said current invention for the other side may is N-time magnify which the N-number is 1 (×1 times), the Surround light on the perispher is from the vertical position flexible printed-circuit-board (which is not available on 2010 because the chip-on-board or dice-on-board not available at market because too expensive and too difficult to make reasonable cost for application yet).

From the '298 for beveled edge mirror (12) (14) with the beveled-edge (12a) (14a) to arrange LED light-beam to form focus on front which will cause the center is Big brighter lighted spots and hurt people eyes for '298 design. The current invention apply for cosmetic is for diffusion light-beams to front for plurality of parallel light-beam to make front panel or area for even brightness without the super-bright focus light-beam.

So, the '298 is not same and not right for the optics-design and concept so not same as current invention spirit and construction and optics-theory (diffusion vs. focus).

Furthermore, the current invention mirror device have other construction for (1) magnify the image from 2 to N-time (N is any number) so it will be curved lens (2) The LED(s) is vertically or horizon offer illumination to the said object or mirror surface directly without the troublesome beveled-edge mirror-area(s) which will reflected (18 side walls of the light chamber 46 may include a reflective material to reflect light from the LED light strips 14 through the rea-side bevel 12a) or refracted light beams to make bad light-performance. Also, the (3) '298 need install the J-chamber (20) which is not practical for current invention for installation the mirror with beveled-aged (12a). and (4) the current invention preferred $2^{nd}$ side of LED lighted-mirror with normal non-magnify mirror also illumination so this is not existing for the said '298 for single side mirrors for '298 device.==>So this is nothing to do with '298 patent for concept, application, feature, installation, optics-theory, mirror type, optic-focus vs. diffusion, light-beam emit out directly without go through the beveled-ages, two mirrors with rotating features.

14. US 2012-0294015 (SMED) as earlier discussion for all difference.

15. US 2008-0091250 (Powell) therapy LED desk lamp '250 powell teach a portable DC power source [0012 line 5 to 8] for easily carry to patient room or do therapy. '250 power teach a controller (126) which is (0017)
(Line 2 to 3) line [selecting the operating mode of the desk lamp 140], or
(line 4 to line 5] [electronic communication with the LED array 108], or
[line 6 to line] include a display and user to select a broad-spectrum light for general uses such as reading, →These are common LED light device from market place and not a patentable on 2007 when the iPhone came out year!
Powell same as current invention to have this basic LED desk lamp to add powell its features to add a. "Therapy treatment light wave light-beam including infra-red, blue, red light beam→(The current invention for reading or working is not use this light color)
+
b. Portable device→(not same as current invention is non-portable device and big-size or weight bas permanently install on desktop before replacing it).
c. [Column 1 (0014) Line5] The '250 for brightness is very bright for 1,000 to 2,000 lux→(This high brightness same as jail-torch light is not use for people reading or working indoor and this brightness will hurt people eyes while long time reading for student, '250 also did not have any anti-glare optic-piece to protect eye, or
d. [Column 1 (0016) line 6} for 15-30 inch around 1 to 2.5 feet has 450 lux (This is too bright for people reading→ (this is not same as current invention for reading or working or accent light which not allow so bright to heart people eyes especially without the anti-glare protection at all.
e. [Column 2 line 10] include a controller 226 which can include a display and user inputs
→Which means this is not like current invention for simple switch or sensor for lower cost desk lamp.
f. [Column 1 (0011) line 5 to 8] for battery power easily carry to patient room or do therapy.
[Column 2 (0018) line 10] The desk lamp 240 may be powered by an internal or external portable power source such as battery. The battery power source may provide the desk lamp 240 with power such that AC power is not required."
For both embodiment all had the same portable power source is batteries.
⇨ This is different with current invention for LED and added functions need more power and batteries do not supply this kind of other added function for power consumptions.
g. [Column 2 (0018) line 15] The batteries may be stored within or proximate to the base 242 or within the LED module 246. The LED module 246 may include one or more LEDs 208, like LED array 108 as described previously.==>Different with current invention the plurality is not powered by batteries at all.
So→The said '250 is not same as LED light of the current invention describe for (a) DC battery power source vs. AC plug-wire (b) portable LED light vs. permanent install on desk top (c) LED light beam for infra-red or blue vs. white light beam only (d) controller is variety functions and memory vs. simple switch or sensor (e) therapy treatment LED desktop light vs. reading or working only without therapy function. (f) movable LED light-module with built-in batteries power source and control vs. non-movable LED light source. Basing on US Patent office have much more the LED desktop light including above discussed LED desktop light of SEMD or others still can get US patents basing on (1) basic LED desktop light with ADDED features so can grant US patents as many of prior arts.
[line 7 to line] allow the user to activate desired therapeutic wave-length so light such as red, yellow, blue, green or infra-red wavelengths or a combination thereof to treat various conditions. which had a very complicated data-storage
16. Re: US Prior art US 2011=0228449 (KEEBLER et al) Filed on Mar. 18, 2010 Public Sep. 22, 2011
Regarding FIG. 3, a plurality of direct current powered devices 305,310,315 which may be powered by a universal power supply system 100 in accordance with an example embodiment are depicted. In one example a common network router 305 is depicted which receives DC power from the second Plug 300A. in second examples, a multiple media player (i-pod) 310 is depicted which receives DC power from the second plug 300B. In the third examples, a cellular telephone 315 receives DC power from the second plug 300B. In each of these examples, the second plug 300A, 300B, 300C are different in physical dimensions (i.e., device specific) and may operate at different direct current voltages as is shown in FIG. 1→so '449 teach all be charge item→Device i-pod or others is not USB female receiving port(s) and the device have different direct current voltage as in shown in FIG. 1.

Also, '449 The said universal power supply system 100, That is lack of (1) No any USB ports with only 1 output current around 5V+/−20% and min.

1 Amp current up or more Amp.

(2) No any LED light to offer the area illumination for reading or work or accent light Amp current up or more Amp.

(3) Most important offer many different voltage DC currents not like current invention only export the 5 Volt+/−20% to charge be-charged products.

17. US 2010-0046249 (Mai) for Diffusion film

'249 Mai teach a film with diffusion and need use plurality of substrates made of different material to get the (light incidence surface) and (light emission surface) for different surface of plurality of layer. 4 This is too complicated than market available for much better optics-lens to make the narrow LED light beam as back light and make the said light diffusion to even brightness.

From Co-inventor co-pending case (#K) U.S. Ser. No. 11/498,874 which also had the optics-piece (5') (5") for incidence and (5") emission surface and back LED light to get even brightness filed on Aug. 4, 2006 which is CIP of 10-954,189 filed on Oct. 1, 2004. Also, the both (5') and (5") is made by injection resin, Not even need to make plurality of layers of the film.

From current invention (#K) US series number 11-498, 874 has other many US prior art which is easier than the filed date Aug. 4, 2006 including U.S. Pat. No. 2,779,630 Clausen, U.S. Pat. No. 5,964,516 Lai, U.S. Pat. No. 6,669,468 pesu, U.S. Pat. No. 6,709,126 Leen, U.S. Pat. No. 6,846,098 Bourdelais, U.S. Pat. No. 7,538,832 Hong, US 2006-0062019 Young, US 2007-0076437 all related for the Optics-piece for make light-beam arrangement.

⇨ So, Mai teach totally nothing to do with the current invention because current invention will not use this kind of plurality of layer of optic-film etc.

Basing on the above listed 3 group discussion for all (17) US and China prior arts it is no any proper prior art for current invention. Hereafter for more discussion for current invention featurBasing on the above listed 3 group discussion for all (15) US and China prior arts it is no any proper prior art for current invention. Hereafter for more discussion for current invention features.

In all such places where people will stay for period of time, the nearby desk top items with LED means and built-in USB-units easily offer electric power to all other electric or digital data device(s), so people do not need to bend the body to find a power source under the table, which normally is farther away than the desk top items having LED means. Hence, this arrangement offers good convenience for people while they work, rest, or even take a nap, so that they can easily use the USB-unit(s) or USB-module of the desk top items with LED means to charge their small phone, computer, iPad™, or any other electric or digital data device(s) while they work, rest, sleep or take a nap.

It is desirable for the universal module of the USB-unit(s) or outlet-unit(s) described in the copending application to be made as small as possible so that it can fit into as many applications' limited housing size as possible and therefore really meet the goal of universal applicability. On the other hand, the smallest, slimmest, or most compact size of the USB-unit(s), outlet-unit(s), or USB-module is too expensive. For example, the APPLE™ iPhone™'s or iPad™'s USB-unit, which is very small in size, needs to use a relatively expensive, high power transformer or inverter to achieve a very short time to fully charge the other electric or digital data device(s). This problem can be resolved if, in order to get the USB-3.0 standard 2.1 amp output from the USB-unit(s), the size of some electric components, parts, or accessories such as transformer or inverter, or other same-function electric parts, or accessories can be increased by placing it in a desk top item with sufficient space, thereby obtaining the same big power output at a substantially lower cost to let the consumer save pocket money. Suitable desk top items to which a universal module, USB-unit, or outlet-unit can be added include a desk lamp, desk top clock, desk top radio, desk top fan, desk top lighting, reading light, wall reading light, head lighting, book light, electric picture display, night light with AC to DC power source or adaptor with prong and wire means, projection light with AC to DC power source or adaptors with prong and wire means, electric candle set with AC to DC power source or adaptors with prong and wire means, or any LED device that can serve as a desk top item as described herein and that can accommodate a USB-unit or USB-ports designed only for charging purposes rather than delivery of digital data. The desk top items can provide function(s), performance, and effects(s) including, by way of example, generation of light beams and projection of images such as time images, as well as serving as a source of illumination, music, power, electric signals, photos, and digital signals for sound, light, music, smell or any conventional market-available devices that people will keep on for a period of time sufficient to also enable charging of other electric or digital data device(s).

BRIEF DESCRIPTION OF THE DRAWINGS

FIG. 1 is a front view of desk top items with LED means having USB-unit(s) to charge other electric or digital data device(s), according to a first preferred embodiment of the invention, which has 2 USB-units and 1 outlet-unit, 12 LEDs, and is powered by a USB plug-wire means.

FIG. 2 is a side view of the desk top items of the first preferred embodiment.

FIG. 3 shows a first design of a second preferred embodiment of the invention having 3 USB-unit(s) with different power output to charge different electric or digital data device(s), for example 500 ma, 1,000 ma, 2,100 ma output to charge different electric or digital data device(s) such as an iPhone™ and iPad™ for different requirements for charging current.

FIG. 7 shows the fourth preferred embodiment, which can also be powered by wind power, chemical power, battery power, a generator, transformer, adaptor, inverter, inductor, etc.

FIG. 8 shows the first preferred embodiment, which has a thicker or higher base to provide a bigger space to arrange bigger size electric parts and accessories to save the cost of super compact, slim, or cute electric parts and accessories, and which also can load a rotating USB-unit(s) or a rotating USB-Module so that a first surface of the USB-module will look nice when the USB-unit(s) or USB-Module is not in use. Details of the rotating USB module are shown in FIGS. 18, 19, 20, 21, and 22

FIGS. 9, 10, 11, and 12 show fifth and sixth preferred embodiments in which desk top items with LED means also have a thicker or higher base, and which can add rotating USB-modules with a plurality of USB-unit(s) and a plurality of other receiving means to increase the number of function(s), feature(s), effect(s), and/or performance(s), the USB-module having more than 1 surface and the capability of changing the surface for different purposes.

FIG. 14 shows desk top items with LED means having USB-unit(s), USB-module, or outlet-unit(s) to allow people to charge other electric or digital device(s), the items including for example a radio, time piece, weather station display, fruit blender, food machine, liquid machine, LED lighting, light fixture, projector, electric fan, heater or any conventional items with LED means built-in.

More specifically, FIG. 9 shows a desk lamp (9a) having a light source and two rotatable modules (9k) (9j) Each of the rotatable modules (9k) (9j) has a built-in desired number of the following:

1. USB-units (9m), and/or
2. an outlet-unit (9n), and/or
3. a USB-module (combine the 2 USB-units into one piece and in one housing or PCB), and/or
4. an outlet-module (combine the 3 outlet-units into one piece and in one housing or PCB), and/or a sealed-unit (has more than one of UBS-unit(s), and/or
5. outlet-unit(s), and/or
6. a universal-unit (at least has one USB-unit or/and outlet-units has housing to fit into uniform compartment which within many of the desk top items housing) to get desired functions. It also has a switch means to turn-on or turn-off the light source for the desk lamp or existing function of the top part of the desk top item. An LED indicator light (9p) on the one of the rotatable module's surface (9k) shows the charging status.

Figure 10:
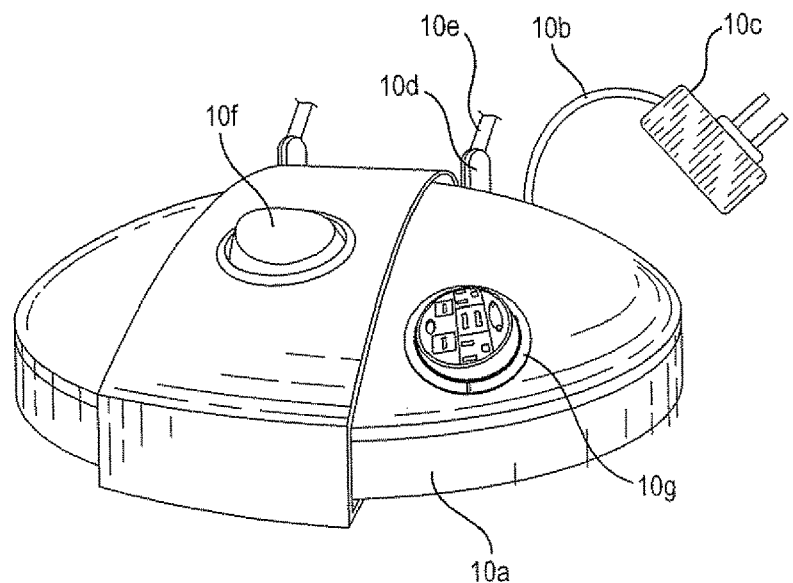

FIG. 10 shows a thicker and more curved base for a desktop item in the form of a desk lamp (10a) having a desired light source for illumination. The desk lamp (10a) has a wired plug (10 b) (10 c) to connect with a wall-outlet (not shown) and an AC 120 Volt current input into an inner circuit (not shown) to convert the wall-outlet's 120V current into a USB DC current and supply the wall-outlet's 120V current to the outlet-unit(s). The bulb, incandescent light, fluorescent light, CFL or energy saving light source is turned on or turned off by the switch (10 f), sensor (10 f), or remote control (10 f) on the top or side surface of the base (10a).

Figure 11:
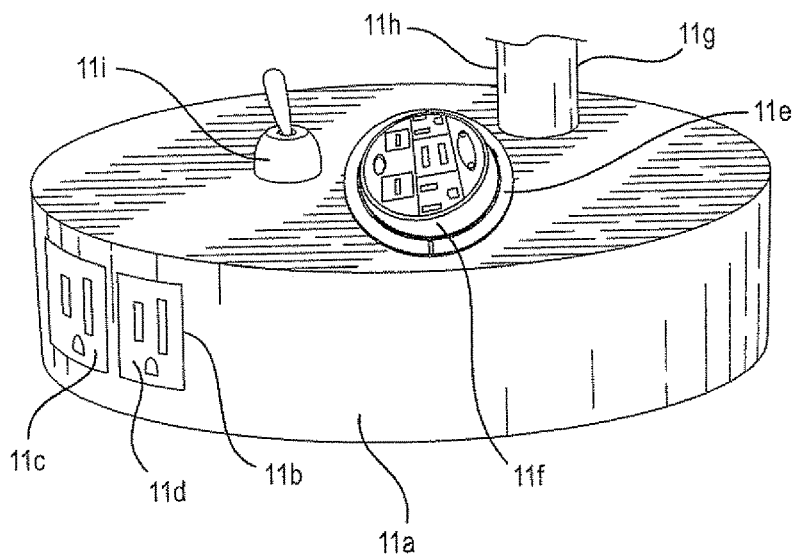

FIG. 11 shows the base (11a) of the desktop lighting which may have any type of the light source (the top part with the light source is not shown) and a rotatable module (11f) having a desired number of USB-unit(s) and/or outlet-unit(s), and optional LEDs to show a charging status. The base (11a) not only has a rotatable module (11f) and but also has an additional outlet-unit or outlet-module(s) (11c) (11d) to allow a user to charge or supply AC power to other electric or digital devices which need AC current input to operate. The base also can have more outlet-unit(s) numbering from 1 to N number (where N can be any number) if the plurality of outlet-unit(s) can fit into the dimensions of a conventional desk top item base (11a) to replace the existing power-strips which lay on the ground to supply the same 120 Volt current.

Figure 12:
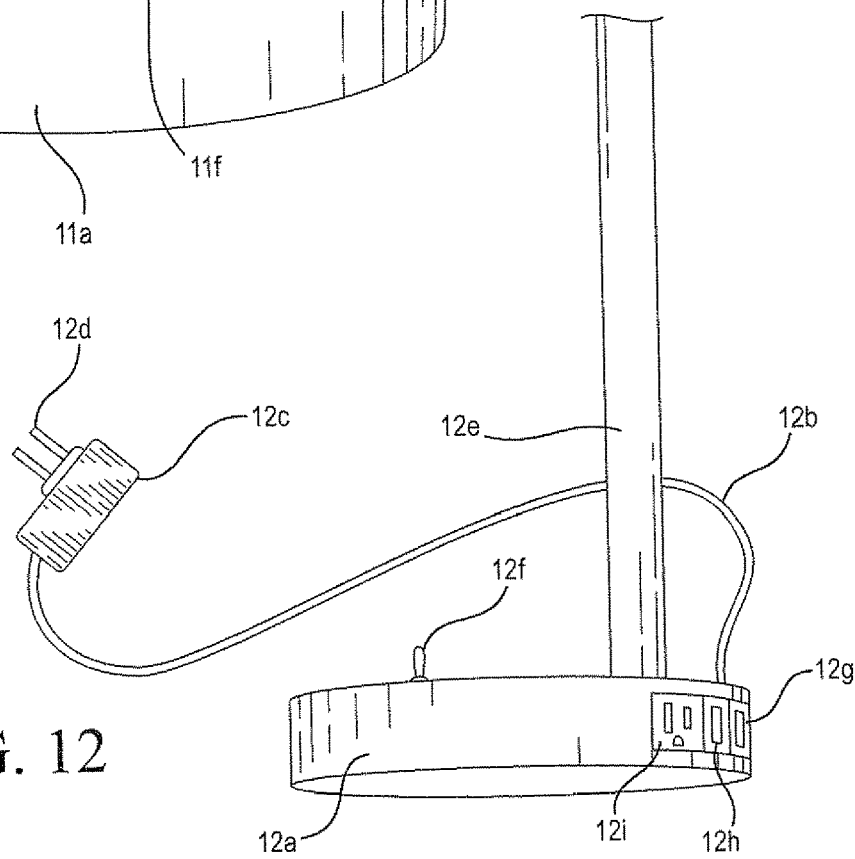

FIG. 12 shows a preferred embodiment in which the desktop item is a lighting device having a preferred light source selected from a bulb, CFL, incandescent light, energy saving bulb or tube having a big base (12a), a rear-side of the base having three or a plurality of the outlet-unit(s) numbering from 1 to any number so it can be connected with other electric or digital data devices to supply or charge the other devices. FIG. 12 also shows a wired plug (12C) having a prong (12d) without any circuit inside so that it can deliver the wall-outlet 120 Volt direct to the three outlets of base (11a) to let people connect with a desk top laptop, speaker, lava light or other electric or digital devices which need 120 Volt AC current to operate.

Figure 15:
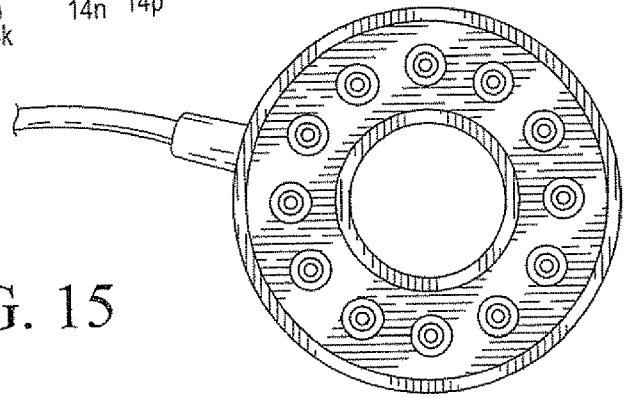
Figure 16:
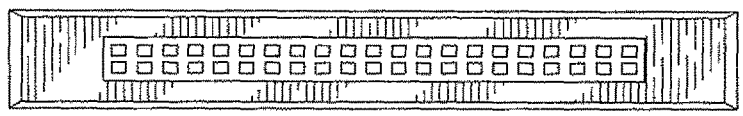
Figure 17:
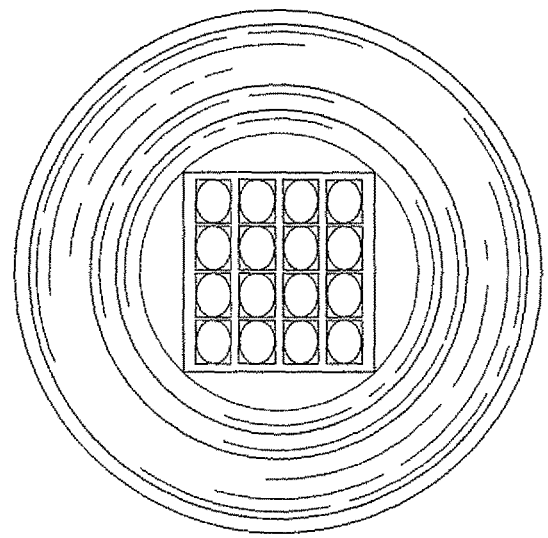
Figure 18:
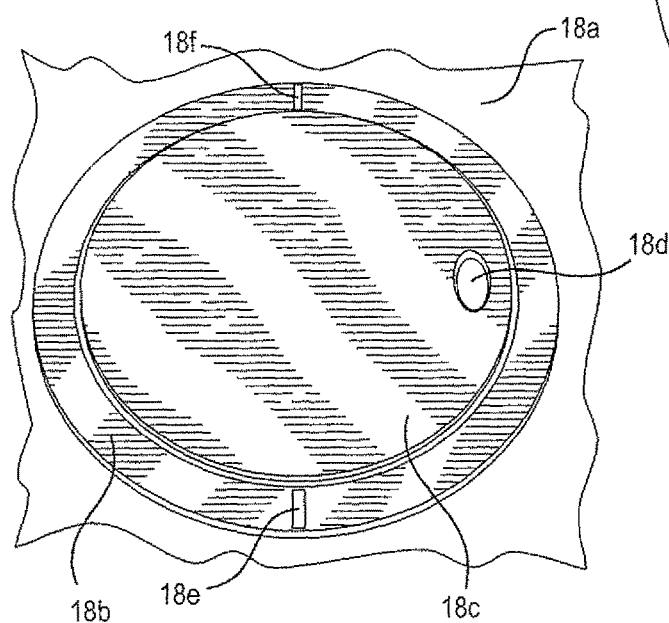
Figure 23:
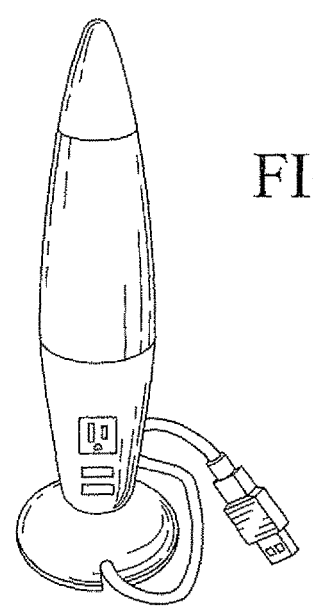
Figure 19:
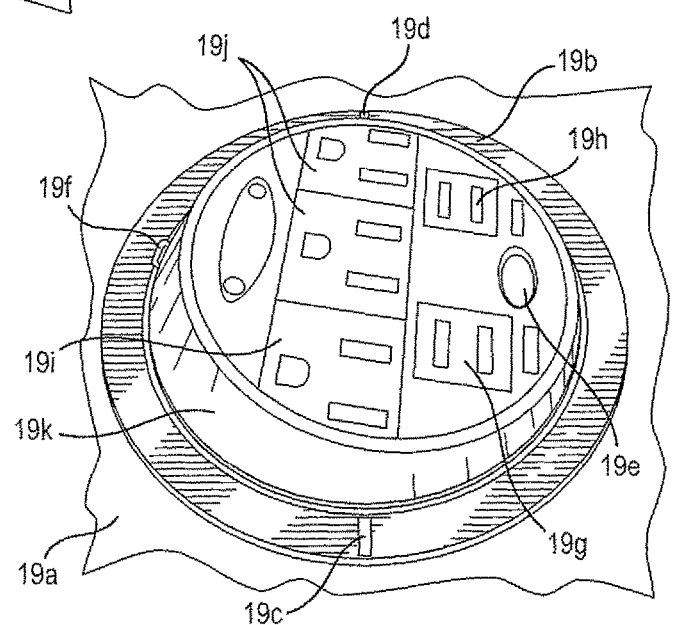
Figure 20:
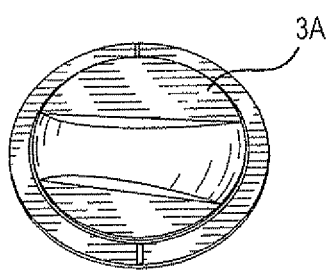
Figure 20:
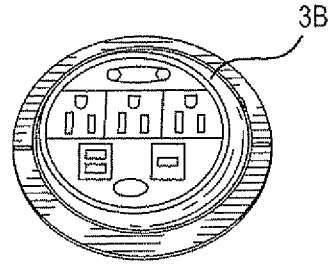
Figure 25:
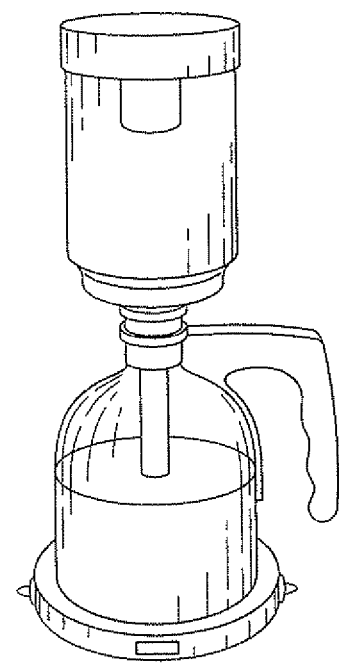
Figure 26:
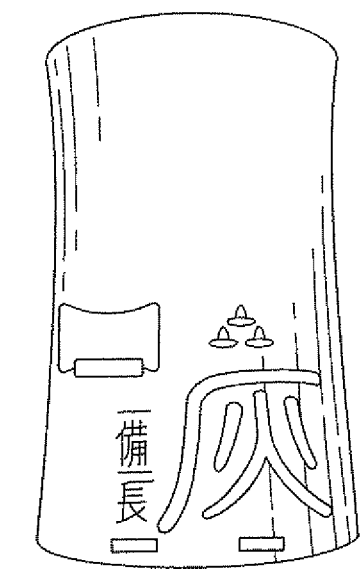
Figure 21:
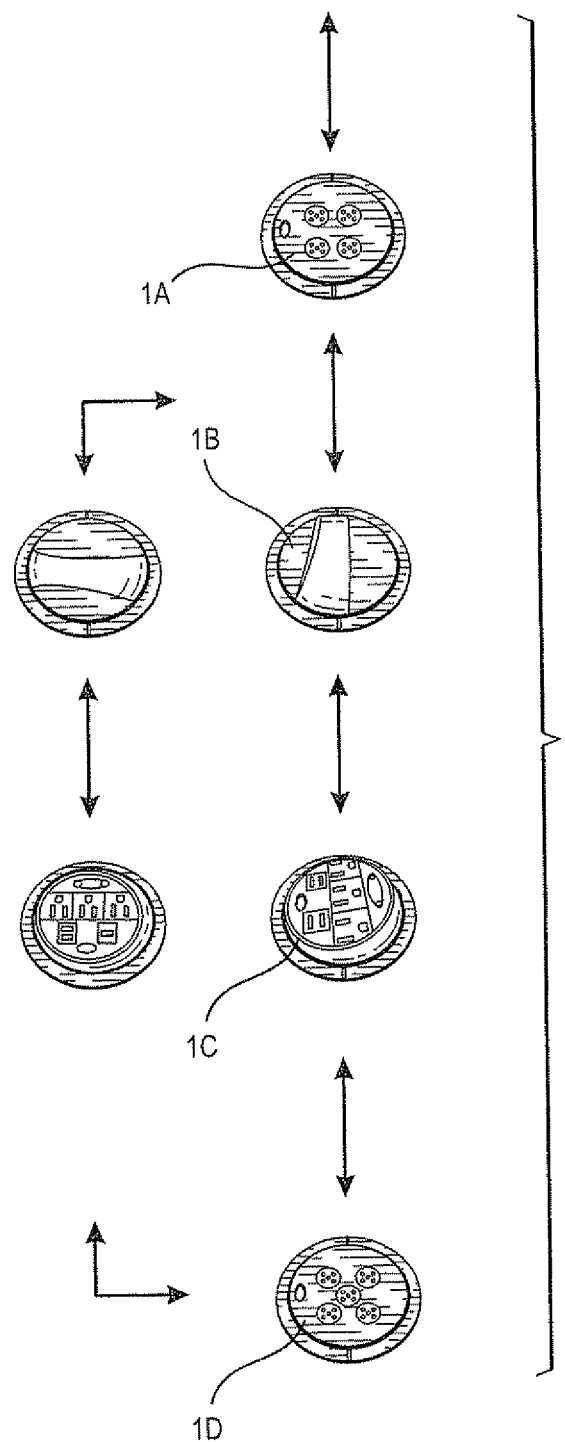
Figure 22:
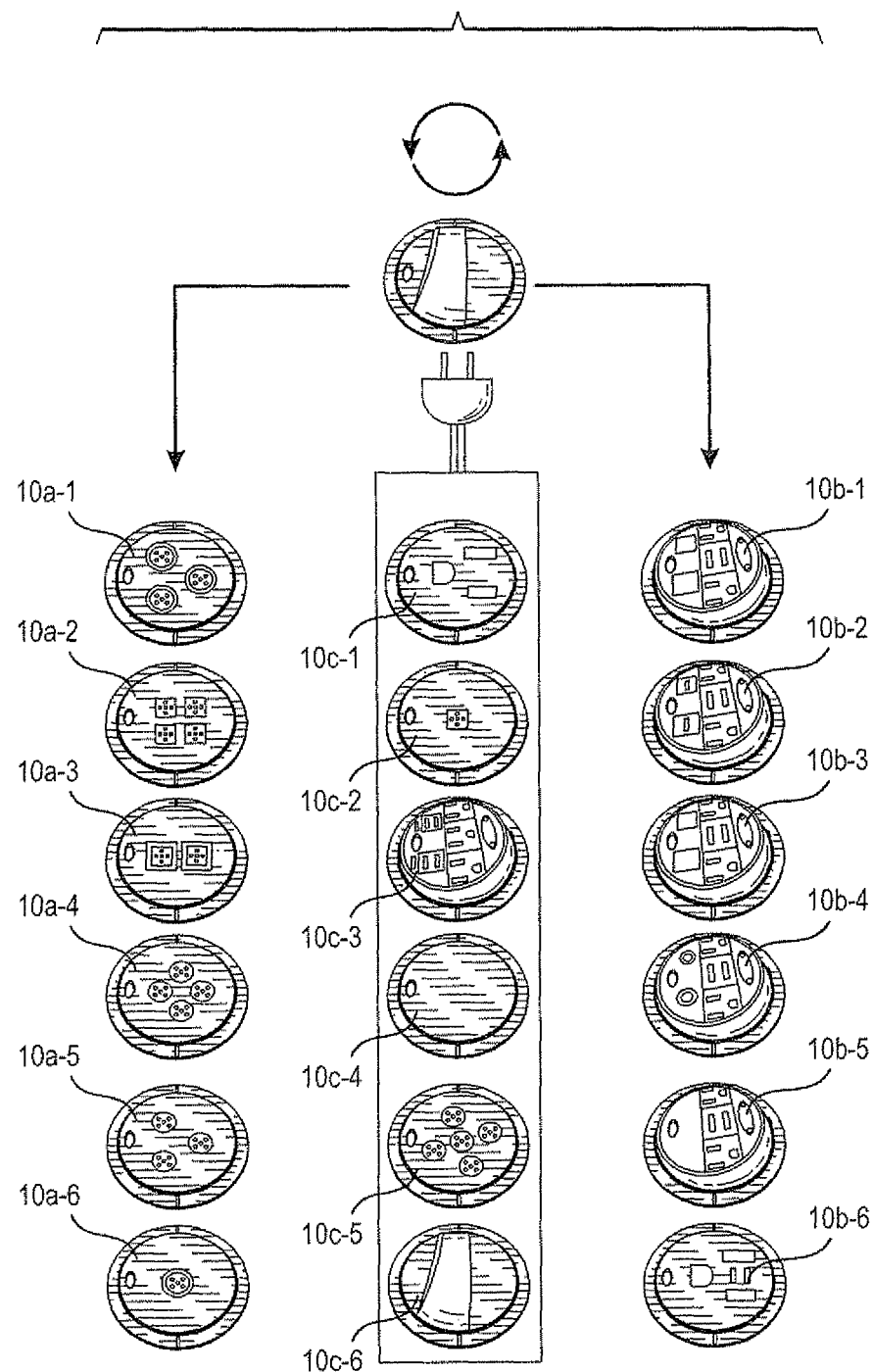
Figure 24:
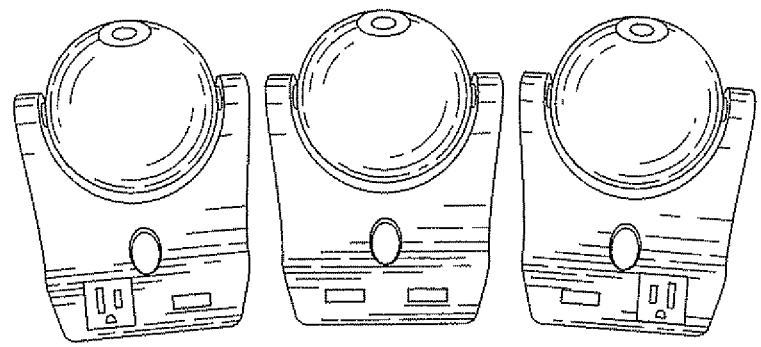
Figure 27:
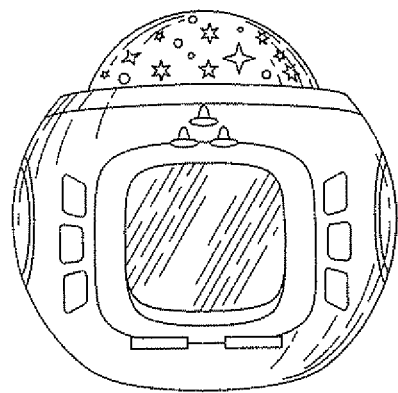
Figure 28:
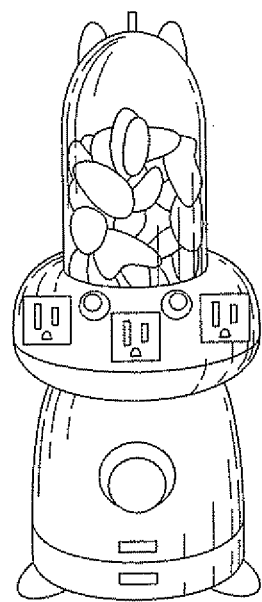
Figure 29:
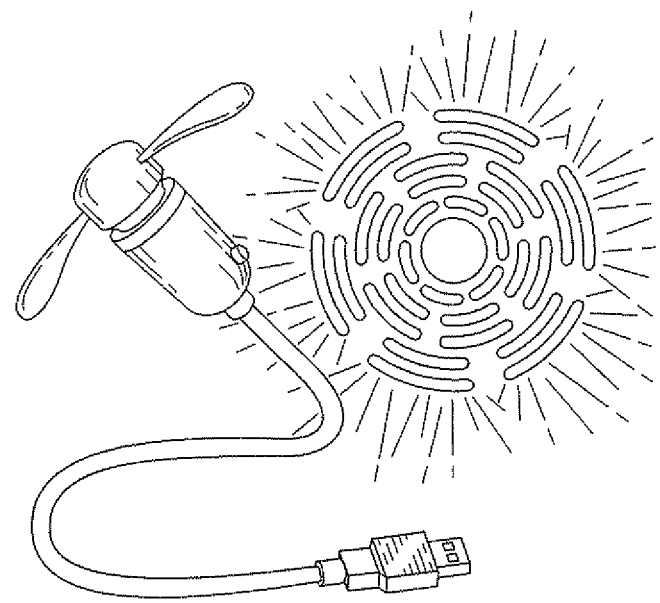

FIGS. 15, 16, and 17 show different LEDs means used for LED lighting in the above-discussed preferred embodiments or other desk top items.

FIGS. 18, 19, 20, 21, and 22 show details of a USB-module with at least one USB-units and a plurality of additional receiving means such as USB-unit(s), outlet-unit(s), Internet-unit(s), adaptor-unit(s), other light means, or other light sources with appropriate parts and accessories.

FIGS. 23, 24, 25, 26, 27, 28, and 29 show all kinds of desk top items which offer function(s), effects(s), and/or performance(s) to people's eye, nose, mouth, and/or ears for a period while people are working, resting, sleeping, or standing.

DETAILED DESCRIPTION OF THE PREFERRED EMBODIMENTS

The present invention provides improvements over the sealed-units disclosed in U.S. patent application Ser. Nos. 12/502,661, 12/292,580, 12/566,322, 11/498,874, 11/527, 629, 12/622,000, and 12/624,621, which have uniform dimensions and shapes to fit into the same uniformly dimensioned compartment and thereby enable the universal sealed-unit to fit into a variety of LED light devices. This invention has more features, functions, and effects to allow people to buy any electric device or digital data device with the additional convenience of including outlet-unit(s) to supply electric power to other device(s), or USB-unit(s) to supply different types of electric power to other device(s). The current invention uses a universal module which can have any combination of the following parts or accessories, including: circuit-means, conductive-means, contact-means, receiving-means, output-ends, input-ends, electric parts and accessories, prong means, rotating means, cable means with a plug, cable means with a USB-plug, printed circuit means, flexible printed circuit means, wires, a cable, a digital data cable, a conductive plate, or any related electric parts or accessories available from the marketplace to get electric power from a prong-cable means, USB-cable means, prong means, or USB means to the outlet-unit's or USB-unit's receiving-means and supply power to a variety of electric devices.

The universal module has a same power-supplying function as the "sealed-unit" for the "LED light devices" described in the inventor's issued U.S. Pat. Nos. 8,342,732, 8,305,246, 8,002,456, 7,726,839, 7,726,841, 7,726,869, 7,618,150, and 7,722,230 and U.S. patent application Ser. Nos. 12/566,322, 12/073,889, 12/894,865, 12/003,809 or the "outlet device" of the inventor's U.S. Pat. No. 7,824,185. Furthermore, the interchangeable "sealed-unit or battery-pack" of the inventor's U.S. patent application Ser. Nos. 12/622,000 and 12/295,562 also utilize concepts shared by the present invention.

FIG. 1 is a front view of a desk top item (1 *a*) with LED means (1 *h*)(1 *i*) and USB-unit(s) (1 *d*)(1 *e*) for charging other electric or digital data device(s) according to a first preferred embodiment of the invention, which has 2 USB-units (1 *d*)(1 *e*) and 1 outlet-unit (1 *f*) at the front of the base. The first preferred embodiment is a 12 LED USB light powered by a USB plug-wire means (1 *b*)(1 *c*) and includes an adjustment arm (1 *g*). FIG. 2 is a side view of the first preferred embodiment of a desk top item (1 *a*) with LED means (2 *h*)(2 *i*) showing 1 USB-unit (2 *e*) and 2 outlet-units (2 *d*)(2 *f*) on the side of the base. The LED means has 12 LEDs (21) in the USB powered light (2 *h*) and is powered from the USB plug-wire mean (2 *b*)(2 *c*).

FIG. 3*a* first design of a second preferred embodiment which has 2 USB-unit(s) (3 *m*)(3N) and an outlet-unit (3 *p*) with different power output to charge different electric or digital data device(s). The USB-unit(s) and outlet-unit may be 500 ma, 1,000 ma, and 2,100 ma units to charge different electric or digital data device(s) such as an iPhone™ and iPad™ that have different requirement for charging current.

Figure 4:
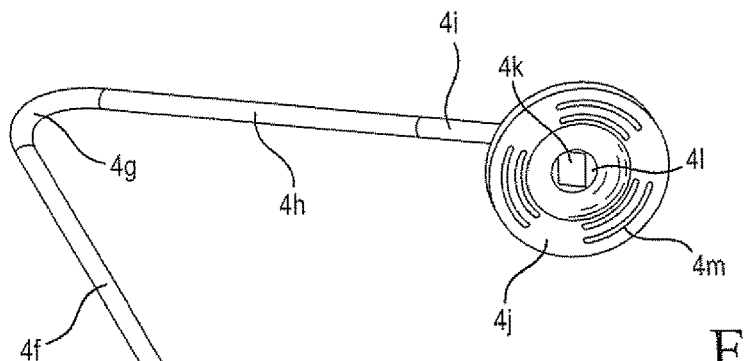
FIG. 4 shows a second design of the second preferred embodiment, which has 2 USB-units and 1 outlet-unit to allow people to charge or supply power to, for example, an iPad™, iPhone™, laptop computer or other device which can get power from the USB-units or outlet-unit.
Figure 4:
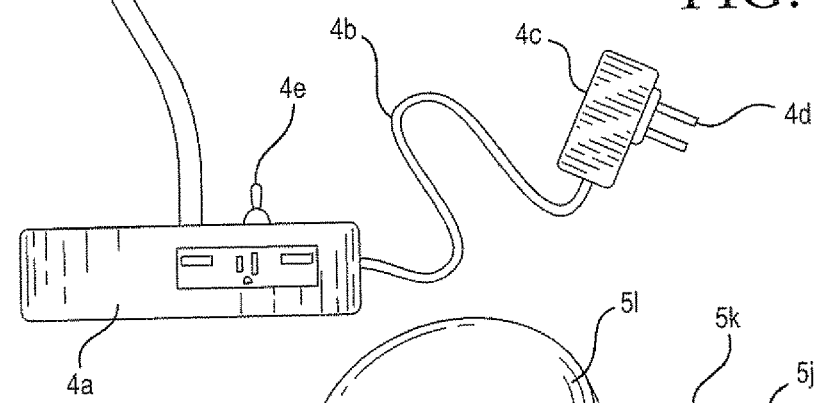

FIG. 4 shows a second design of the second preferred embodiment which has 2 USB-units and 1 outlet-unit to allow people to charge or supply power to an iPad™ iPhone™, laptop computer, or other device which can get power from the USB-unit(s) or outlet-Unit. The drawing also shows the differences between the first and second preferred embodiments. All such alternative designs, and any improvements or devices with an equivalent function or that are replaceable by the preferred items will still fall within the scope of the current invention, including variations disclosed in the inventor's other patents and patent applications may also fall within the scope of the current invention.

Figure 5:
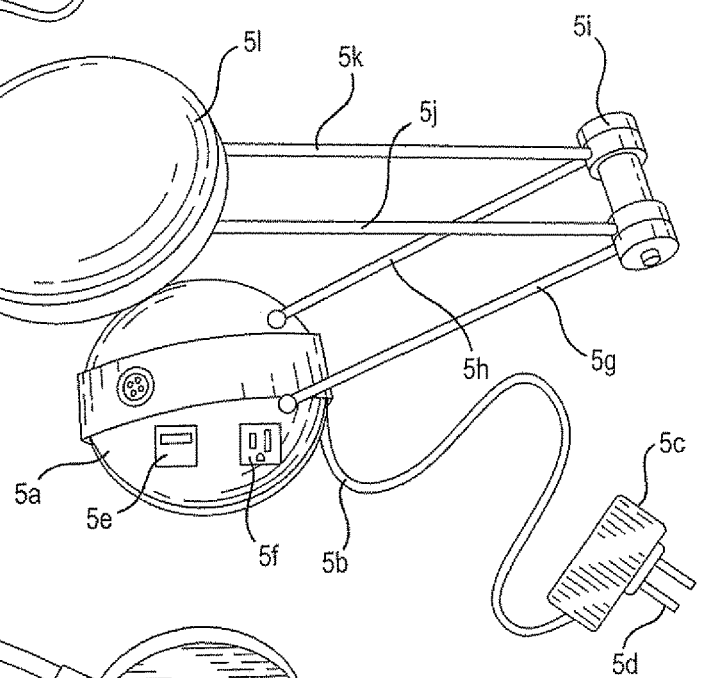
FIG. 5 shows a third preferred embodiment of a desk top item in the form of an LED lighting fixture with adjustable arms to enable adjustment of the height, orientation, direction, and/or angle of the LED lamp to provide the best illumination. The built-in 1 USB-unit and 1 outlet-unit has a lower cost than the above-discussed items with a plurality of USB-units and outlet-units and is powered by a UL listed adaptor with a transformer plugged into a wall outlet that supplies 120 Volt AC current, rather than by a USB plug and wire.

FIG. 5 shows a third preferred embodiment of a desk top item in the form of an LED lighting fixture (5 *a*) with adjustable arms (5 *g*)-(5*j*) to enable the LED lamp to be moved to a desired height, orientation, direction, and/or angle to get the best illumination to people. The built-in 1 USB-unit (5 *e*) and 1 outlet-unit (5 *f*) have a lower cost than other above-discussed USB-units and outlet-units because they do not need to be made as compact. The desk top item is powered the transformer of a UL listed adaptor (5 *c*)(5 *d*) that receives power from a wall outlet for 120 Volt AC current rather than the USB plug and wire of the first preferred embodiment.

Figure 6:
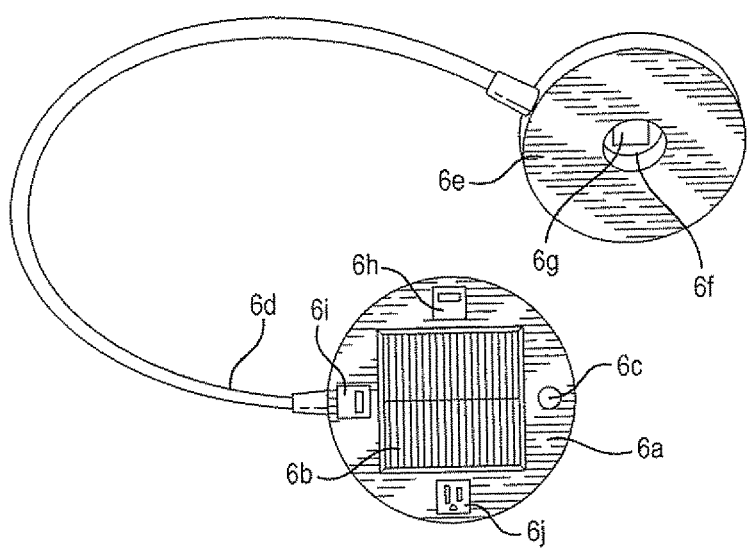
FIG. 6 shows a fourth preferred embodiment which is powered by solar power and stores the solar electricity inside rechargeable batteries to provide enough power to charge other electric or digital data device(s) through built-in USB-unit(s) and outlet-unit(s) incorporated with proper circuit means to meet market requirements.

FIG. 6 shows a fourth preferred embodiment which is powered by a solar power array (6 *b*) and which stores the solar electricity inside rechargeable batteries that have enough power to charge other electric or digital data device(s) though the built-in USB-unit(s) (6 *i*)(6 *h*) and outlet-unit (6*j*) having appropriate circuit means to meet market requirements.

FIG. 7 also shows the fourth preferred embodiment of a desk top item (7 *a*) and USB module (7 *d*), which can be powered by a solar panel (7 *b*) or other available power sources including wind power, chemical power, battery power, a generator, a transformer, adaptors, an inverter, an inductor, etc., and which may further include a switch (7 *c*) and lamp post (7 *e*) corresponding to the one shown in FIG. 6.

FIG. 8 shows that the base of the desk top item of the first preferred embodiment may be made thicker or higher to accommodate bigger size electric parts and accessories to save a lot of the cost of super compact, slim, or cute size electric parts and accessories. Furthermore, the thicker or higher base can also accommodate a rotating USB-unit(s) or USB-module that can be rotated from a first surface to a second surface so that the first surface of the USB-module will look nice when the USB-unit(s) or module is not in use. Details of the rotating USB module can be understood from FIGS. 18, 19, 20, 21, and 22, the details of which are explained in the inventor's copending U.S. patent application Ser. No. 13/117,227. It will be appreciated that the details disclosed in the copending application may be applied to the present embodiments without departing from the scope of the current invention.

FIGS. 9, 10, 11, and 12 show fifth and sixth preferred embodiments which also have a thicker or higher base for the desk top items with LED means, and to which rotating USB-modules having a plurality of USB-unit(s) and other receiving means can be added to increase the number of function(s), feature(s), effects, and/or performance(s). The USB-modules (9 *k*) to (9 *m*), (10(*g*), and (11 *e*) to (11 *f*) of these embodiments have more than 1 surface to enable different surfaces to be exposed for different purposes. The more than 1 surface of the USB-module can be any number from 2 to N.

Figure 13:
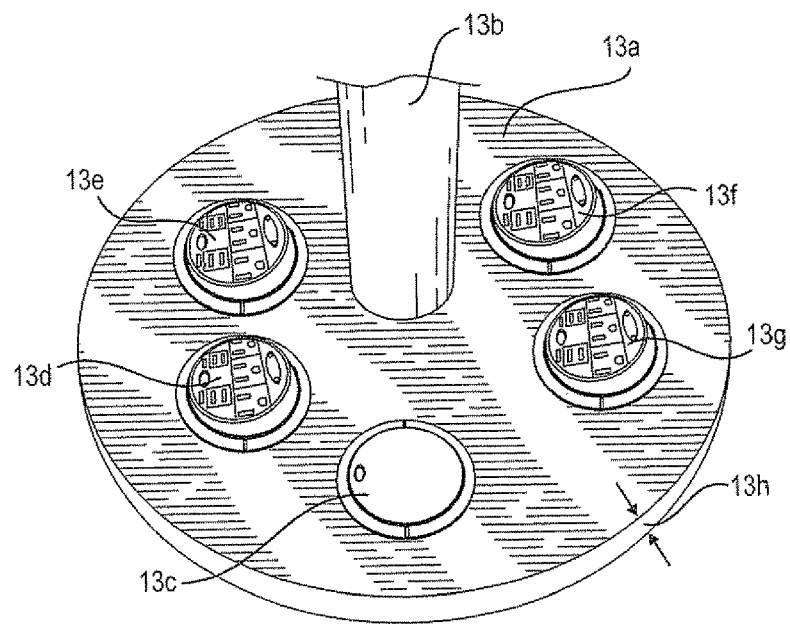
FIG. 13 shows a desk top item which has a super big base size so that a plurality of rotating USB-modules can be installed to enable a group of people to charge their electric or digital device(s) at the same time. Such a simultaneous charging arrangement may be used in a train station, a bus station, an airport, a meeting room, a hotel lobby . . . etc.

FIG. 13 shows a desk top item (13 *a*) which has a super big base (13 *h*) so that a plurality of rotating USB-Modules (13 *c*) to (13 *g*) can be installed to enable a group of people to charge their electric or digital device(s) at the same time, such as in a train station, bus station, airport, meeting room, hotel lobby . . . etc.

Figure 14:
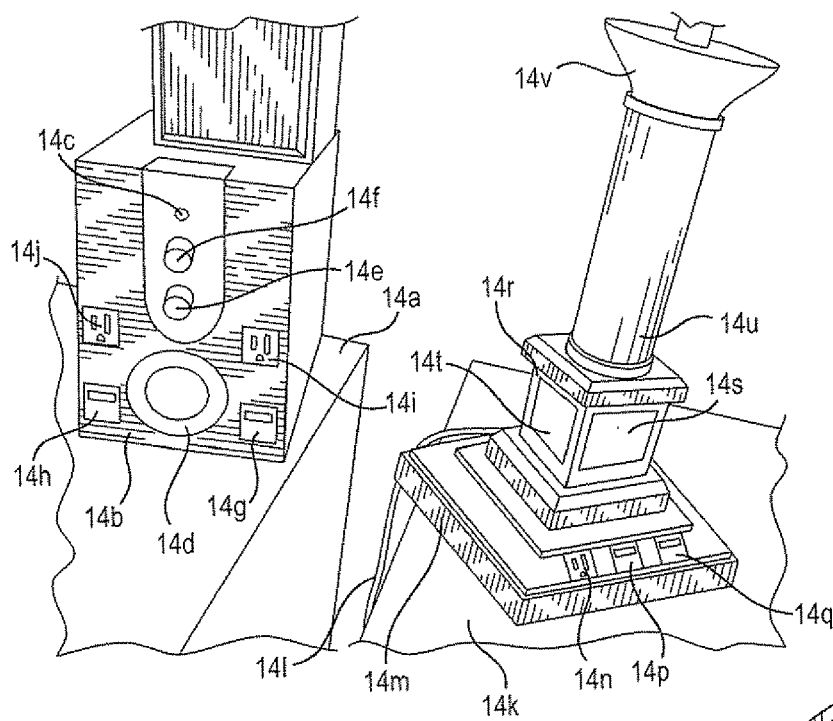

FIG. 14 shows desk top items with LED means and USB-unit(s) (14 *h*)(14 *g*)(14*p*)(14*q*), USB-module(s), or outlet-unit(s) (14 *i*)(14*j*)(14*n*) to allow people to charge other electric or digital device(s), the items including a radio, timepiece, weather station display, fruit blender, food machine, liquid machine, LED lighting, light fixture, projector means, electric fan, heater or any conventional items with LED means built-in.

FIGS. 15, 16, and 17 show different LEDs means used for LED lighting in the above-discussed preferred embodiments or other LED desk lamp or LED lamp for a desk top.

FIGS. 18, 19, 20, 21, and 22 show details of a USB-Module (18 *b*)(19 *b*) with at least one USB-unit (19 *g*) and a plurality of additional receiving means, which may include a USB-unit(s) (19 *h*), outlet-unit(s) (19 *i*)(19*j*), internet-unit(s), adaptor-unit(s), other light means, or another light source with appropriate parts and accessories, or any conventional available receiving means, the USB-module having at least more than 2 surface(s) (e.g., surface (18 *c*) on one side and the USB-unit(s) on the other side), each surface with its own special design.

FIGS. 23, 24, 25, 26, 27, 28, and 29 show all kinds of desk top items which offer function(s), effects(s), performance(s) to people's eyes, nose, mouth, and ears so that people can stay nearby for a period of time as they work, rest, sleep, or stand. The desk top items each have LED means and a USB-unit(s) to charge other electric or digital data device(s) and are arranged to generate, exhibit, or provide light beams, a projected image, a time image, a clock, illumination, music, a power source, electric signals, photos, digital signals, air flow at a desired temperature, moisture, steam, smells, liquid, coffee/tea, and/or food, or to serve as any other conventional device that people will stay around for a period of time while their other devices are charging.

The desk top items, which include LED means or an LED device, are items that are used in locations where they can be easily reached, touched, operated, or managed by people, i.e., in locations or places nearby where people will stay for period of time, such as a desk, table, bed, chair, land, grass, or wherever else people like to work, rest, sit, stand, or a take nap.

As noted above, the desk top items may offer electric signals to carry out functions such as illumination, sound, images, brightness, visual effects, smell, water, liquid, food, wind, moisture, airflow or any conventional functions of electric devices with built-in LED means, such as LED lighting, a clock, projector machine, film, digital photo frame, time display, air freshener, electric perfume freshener, moisturizer, electric fan, electric heater, electric steam spreader, electric cooler, electric air conditioner, or other conventionally available items that can be placed to let people easily reach, touch, operate, or manage the items.

The desk top items may be powered by a direct current (DC) power source or alternating current (AC) power source having appropriate electric parts and accessories or components, such as circuit means, IC means, sensor means, a motion sensor, timer means, time delay means, timer, resilient means, conductive means, transformer means, inverter means, adaptor means, wire means, prong means, UL listed adapter means, PIR means, infrared means, master power control means, and/or AC power outlet-unit(s) to offer electric power at a voltage (Volt) and amperage (Amp or ma) sufficient to achieve a desired charging time. The USB-unit(s) only serve as a power source for charging other electric or digital device(s) and do not have an electric data transfer function. If a plurality of USB-units are provided, the USB-units can be arranged to have different output power to charge different electric or digital data device(s). If additional outlet-units are provided the outlet-units may be AC outlet-unit(s) that serve as an AC power source.

Electric or digital data device(s) that may be charged by the USB-unit(s) include an MP3 or MP4 player, smart phone, computer, iPhone™, iPad™, video game, digital visual equipment, communication equipment, and other consumer electric products.

The USB-unit or USB-module of the preferred desk top items may be turned on or turned off for a predetermined time by switch means, sensor means, timer means, photo sensor means, motion means, time delay means, and/or master control power means.

All electrical connector or plug receiving means in the desk top items, including USB-units or USB modules, may have a removable cover to allow kids or others to safely touch the items and prevent dust, or water from getting into the receiving means.

The USB-unit or USB-module to charge other electric or digital device(s) can be removable from the desk top items and carried with people to use when people leave the desk top items. For this purpose, the USB-unit(s) or USB-module(s) can be disassembled from the desk top items and re-assembled into the said desk top items by means such as a quick connector or adaptor, or assembly or fixing means for assembling or fixing the USB-units or modules to the desk top items, with each of the USB-unit(s) or USB-module(s) having its own safety certification(s) so that the individual USB-unit(s) or USB-module(s) can be tested by safety authorities and sold separately.

The USB-unit(s) includes an electric charging unit which has a USB-female receiving means to receive a USB-male prong to deliver electric power from the USB-female receiving means to the other device's USB-male prong. The preferred USB-female receiving means gets power from a power source and uses its circuit means to convert or transform the electric power to a desired waveform, voltage, and current sufficient to charge other electric or digital device(s) through the USB male means.

The items of these embodiments may be in the form of LED lighting, an LED desk lamp, LED table lighting, LED lava light, LED projection light, LED time piece, LED electric fan, LED air freshener, LED indicator coffee machine, LED indicator sound device, and LED visual device.

I claim:

1. A non-portable desk top LED reading light, comprising:
at least one LED fixed within a top or front area of at least one adjustable arm and incorporated with an integrated circuit and a switch for reading light illumination from the top or front area of the at least one adjustable arm; and
a USB unit for charging another device,
wherein the LED light is powered by an external transformer through a transformer wire having (1) a male USB plug, (2) a DC connector, or (3) a wiring end, to connect with the desktop USB unit.

2. A non-portable desk top LED light, comprising:
a plurality of white LEDs to provide reading illumination from a top area of at least one adjustable arm, and
a plurality of white and colored LEDs to provide an LED accent light or LED night light illumination,
wherein the LED light has an external transformer having an AC-to-DC circuit to change AC power to DC power and to supply or distribute DC voltages or currents to (i) an integrated circuit for controlling white LEDs to provide reading illumination, or for controlling the white and colored LEDs to provide LED accent light or LED night light illumination, and (ii) a USB charger system,
wherein at least one of an integrated circuit and a switch is provided to control, adjust, change, or select a color or brightness of the LEDs; and
wherein the USB charging system is for charging at least one other product.

3. A non-portable desk top LED light, comprising:
a plurality of white, colored, or white and colored LEDs for LED night light or LED accent light illumination, and
a diffusor, fan, or sprayer for generating, exhibiting, or providing air flow, moisture, scent, essential oils, or air freshener spray;

an integrated circuit and switch to control adjusting, changing or selecting at least one of a color, brightness, and illumination functions of at least one of the LEDs; and a USB unit for charging at least one other product, wherein the LED light further includes at least one of an integrated circuit, sensor, motion sensor, timer, time delay, and parts for controlling at least one function of at least one of (1) the LEDs, (2) the LED light, and (3) the diffusor, fan, or sprayer.

4. A non-portable desk top LED light, comprising:

at least one LED for area illumination;

a built-in sprayer for generating, exhibiting, or providing steam or scent or moisture;

an integrated circuit and switch to control adjusting, changing or selecting at least one of a color, brightness, and illumination function of the at least one LED; and a USB unit for charging at least one other product, wherein the LED light further includes at least one of an integrated circuit, sensor, motion sensor, timer, time delay, or parts for controlling a function of at least one of (1) the LEDs, (2) the LED light, and (3) the sprayer.

5. A non-portable desk top LED light, comprising:

at least one LED for area illumination without presenting a message or meaning;

a device for generating, exhibiting, projecting, or displaying an image or time;

an integrated circuit and switch to control adjusting, changing or selecting at least one of a color, brightness, and illumination function of the at least one LED; and a USB unit for charging at least one other product, wherein the LED light further includes at least one of a sensor, motion sensor, timer, time delay, or parts and accessories for controlling a function of at least one of (1) the LEDs, (2) the LED light, and (3) the device.

6. A non-portable desk top reading light device, comprising:

at least one LED light source for reading light illumination from a top or front of at least one adjustable arm, an integrated circuit to control light functions and effects; and a USB charger, wherein power is supplied by an external transformer that changes AC into DC to supply different operating power to each one of the LED light source, the integrated circuit, and the USB charger.

7. A non-portable desk top item, wherein the desk top item is an LED accent or LED night light, comprising:

at least one LED light source for accent or night illumination;

an integrated circuit to control at least one of (a) the at least one LED and (b) light functions and effects; and at least one of an airflow, scent or steam diffusor, air freshener, time display, and moisture sprayer device built into the desk top item; and at least one USB charger for charging at least one other product, wherein the desk top item is powered by an external transformer that changes AC current into DC current to supply predetermined DC power to the at least one of (1) the LED light source, (2) the integrated circuit, (3) the USB charger, and (4) the airflow, scent or steam diffusor, air freshener, time display, or moisture sprayer device.

8. A non-portable desk top reading light, comprising:

at least one LED light source for reading light illumination from a top area of at least one adjustable arm, wherein the desk top reading light has an integrated circuit to control at least one of:

(1) the reading light or at least one LED function or effect; and (2) at least one of an airflow, scent or steam diffusor, air freshener, time display, and moisture sprayer device built into the LED reading light; and at least one USB charger for charging at least one other product, wherein power is supplied by an external transformer that changes AC into DC to supply different power to at least one of (1) the at least one LED light source, (2) the airflow, scent or steam diffuser, air freshener, time display, or moisture sprayer device, and (3) the at least one USB charger.

9. A desk top LED item, wherein the desk top item is an image projection, reflection, or capturing LED light, comprising:

at least one LED for supplying a bright light for an image projection device, image reflection device, or image capture device, wherein the LED item having an integrated circuit to control at least one of (A) LED light functions, and (B) LED color, brightness, or visual effects; and a USB charging system to charge at least one other product;

wherein the LED item is powered by an external transformer that changes AC current into DC current to supply predetermined different DC power to at least one of the LED light source, the USB charging system.

10. A desk top LED light, comprising:

at least one LED light source for front film, slide, person, or object illumination, the LED light having at least one of an integrated circuit to control light and LED functions and effects;

at least one of an image projection device, image reflection device, and image capture device built into or attached to the LED light; and at least one USB charger for charging another device, wherein the LED light is powered by an external transformer that changes AC into DC to supply different power to at least one of (1) the LED light source, and (2) the USB charger.

11. A non-portable desk top LED light, comprising:

at least one of an LED bulb and CFL bulb for area or reading illumination; and at least one USB charger for charging at least one other product, wherein the non-portable desk top LED light is supplied with AC power by an AC plug wire, and the LED or CFL bulb has a built-in AC-to-DC circuit for converting the AC power into DC power for supply to at least one LED circuit within the LED bulb or to the CFL bulb.

12. A non-portable desk top time product, comprising:

more than one LED configured as a digital time display light source or LCD digital display backlight source;

at least one integrated circuit to control or adjust at least one of the more than one LED, the time display light source, the LCD digital display backlight source, and time display functions or effects;

at least one USB charger for charging at least one other product; and at least one built-in AC-to-DC circuit for converting AC power input through an AC plug wire into at least one pre-programmed different DC current for supply to the at least one time display device, at least of the more than one LED, the at least one integrated circuit, and the at least one USB charger.

13. A non-portable desk top LED light, comprising:
at least one of an LED bulb and CFL bulb having a built-in AC-to-DC circuit for area or reading illumination; and
at least one USB charger for charging at least one external product,
wherein the CFL or LED bulb is supplied with AC power by an AC plug wire, and
the non-portable desk top LED light has a built-in AC-to-DC circuit for converting the AC power supplied by the AC plug wire into DC power for supply to the at least one USB charger.

* * * * *